US012592634B2

(12) United States Patent
Yu et al.

(10) Patent No.: US 12,592,634 B2
(45) Date of Patent: Mar. 31, 2026

(54) DIRECT CURRENT CONVERTER, CONTROL METHOD, DIRECT CURRENT COMBINER BOX, AND PHOTOVOLTAIC POWER GENERATION SYSTEM

(71) Applicant: Huawei Digital Power Technologies Co., Ltd., Shenzhen (CN)

(72) Inventors: Xinyu Yu, Shanghai (CN); Jinxiang Zhan, Shanghai (CN); Fuqiang Xu, Shanghai (CN); Jun Wang, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 250 days.

(21) Appl. No.: 18/327,286

(22) Filed: Jun. 1, 2023

(65) Prior Publication Data

US 2023/0318464 A1 Oct. 5, 2023

Related U.S. Application Data

(63) Continuation of application No. PCT/CN2021/071664, filed on Jan. 14, 2021.

(51) Int. Cl.
*H02M 3/00* (2006.01)
*H02J 3/38* (2006.01)
(Continued)

(52) U.S. Cl.
CPC ............... *H02M 3/01* (2021.05); *H02J 3/381* (2013.01); *H02M 1/0095* (2021.05);
(Continued)

(58) Field of Classification Search
CPC ...... H02M 1/0095; H02M 3/01; H02M 3/015; H02M 3/158; H02M 3/1588; H02J 3/381
See application file for complete search history.

(56) References Cited

U.S. PATENT DOCUMENTS

| | | | |
|---|---|---|---|
| 6,222,351 B1* | 4/2001 | Fontanella | H02M 3/07 |
| | | | 323/267 |
| 6,972,547 B2* | 12/2005 | Murakami | H02M 3/156 |
| | | | 323/267 |
| 2022/0021312 A1* | 1/2022 | Hirokawa | H02M 3/33571 |

FOREIGN PATENT DOCUMENTS

| | | |
|---|---|---|
| CN | 109361314 A | 2/2019 |

OTHER PUBLICATIONS

Rodrigues et al., "Three-Level ZVS Active Clamping PWM for the DC-DC Buck Converter", IEEE Transactions on Power Electronics, Oct. 2009, vol. 12, No. 10, XP011272067, 10 pages.

(Continued)

*Primary Examiner* — Gary L Laxton
(74) *Attorney, Agent, or Firm* — Maier & Maier, PLLC

(57) ABSTRACT

A direct current converter includes a three-level power switching circuit, a resonant circuit, and a controller. An output voltage at an output end of the three-level power switching circuit is used to charge the resonant circuit. The controller is configured to control power switching components in the three-level power switching circuit, so that when the resonant circuit performs charging or discharging at one half of a direct current voltage, one of the power switching components is connected to a current loop of the resonant circuit, and when the resonant circuit performs charging or discharging at the direct current voltage, two of the power switching components are connected to the current loop of the resonant circuit. By using the direct current converter, a voltage borne by the power switching component in the direct current converter during current conversion can be reduced, thereby improving reliability of the direct current converter.

18 Claims, 17 Drawing Sheets

(51) Int. Cl.
H02M 1/00 (2006.01)
H02M 3/158 (2006.01)

(52) U.S. Cl.
CPC ........... H02M 3/015 (2021.05); H02M 3/158 (2013.01); H02M 3/1588 (2013.01); *H02J 2300/24* (2020.01)

(56) References Cited

OTHER PUBLICATIONS

Song et al., "Dead-Time Effect and a Neutral Point Voltage Control for a Single-Phase NPC Converter", Electrical Machines and Systems, 2008 International Conference, IEEE, Oct. 17, 2008, pp. 1421-1426.

Infineon, "How to calculate and minimize the dead time requirement for IGBTs propely", Power Management and Drives, Application Note, V1.0, AN2007-04, May 7, 2008, 16 pages.

* cited by examiner

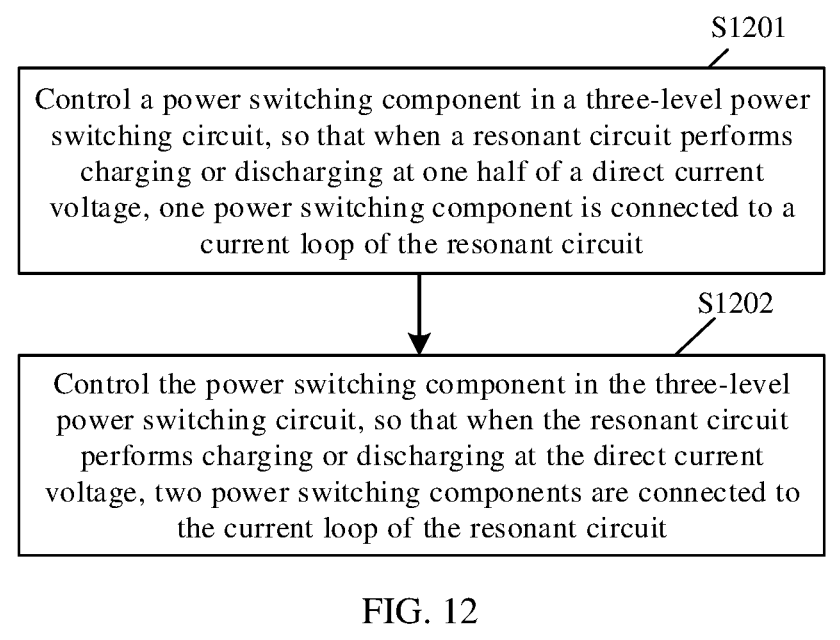

S1201

Control a power switching component in a three-level power switching circuit, so that when a resonant circuit performs charging or discharging at one half of a direct current voltage, one power switching component is connected to a current loop of the resonant circuit

S1202

Control the power switching component in the three-level power switching circuit, so that when the resonant circuit performs charging or discharging at the direct current voltage, two power switching components are connected to the current loop of the resonant circuit

FIG. 12

DIRECT CURRENT CONVERTER, CONTROL METHOD, DIRECT CURRENT COMBINER BOX, AND PHOTOVOLTAIC POWER GENERATION SYSTEM

CROSS-REFERENCE TO RELATED APPLICATIONS

This application is a continuation of International Application No. PCT/CN2021/071664, filed on Jan. 14, 2021, the disclosure of which is hereby incorporated by reference in its entirety.

TECHNICAL FIELD

The embodiments relate to the field of photovoltaic power generation technologies, a direct current converter, a control method, a direct current combiner box, and a photovoltaic power generation system.

BACKGROUND

Photovoltaic power generation is a technology that uses a photovoltaic effect of a semiconductor interface to convert light energy into electric energy. A photovoltaic power generation system may include a photovoltaic string, a power converter, an alternating current power distribution device, and the like. The power converter used in the photovoltaic power generation system mainly includes a direct current converter and a photovoltaic inverter. Using a magnetic element such as an inductor and a transformer to transfer energy, a conventional direct current converter has a large volume and a low power density, and often works in a hard-switching state, resulting in a large switching loss and low efficiency. To improve performance of the direct current converter, various new types of converters are constantly proposed.

FIG. 1 is a schematic diagram of a direct current converter using a two-level RSC circuit.

The direct current converter in the figure uses a resonant switched capacitor (RSC) circuit. Energy is transferred through a resonant circuit 10 (including a resonant inductor and a resonant capacitor), which not only reduces a volume of the direct current converter, but also enables power switching components to work in a soft-switching state. This reduces a switching loss and improves efficiency. Power switching components T1 and T2 of the direct current converter are complementarily conducted. When the T1 is conducted and the T2 is shut off, a capacitor Cin charges a resonant capacitor Cr. When the T2 is conducted and the T1 is shut off, the resonant capacitor Cr charges a capacitor Cout. In the foregoing process, a voltage borne by the power switching components T1 and T2 is a direct current input voltage from the direct current converter, and the voltage is relatively high. Therefore, power switching components with a relatively high voltage withstand specification needs to be selected, which reduces reliability of the direct current converter.

SUMMARY

The embodiments may provide a direct current converter, a control method, a direct current combiner box, and a photovoltaic power generation system, to reduce a voltage borne by power switching components and improve reliability of the direct current converter.

According to a first aspect, the embodiments may provide a direct current converter, and an input end of the direct current converter is connected to a direct current voltage, The direct current converter includes a three-level power switching circuit, a resonant circuit, and a controller. An input end of the three-level power switching circuit is connected to the direct current power supply, and an output voltage at an output end of the three-level power switching circuit is used to charge the resonant circuit. The controller is configured to control power switching components in the three-level power switching circuit, so that when the resonant circuit performs charging or discharging at one half of the direct current voltage, one of the power switching components is connected to a current loop of the resonant circuit, and when the resonant circuit performs charging or discharging at the direct current voltage, two of the power switching components are connected to the current loop of the resonant circuit.

In the direct current converter, energy is transferred by using the resonant circuit. The three-level power switching circuit first charges the resonant circuit, and then the resonant circuit discharges an output end. The controller controls the three-level power switching circuit, so that when the resonant circuit switches from performing discharging to performing charging, and a charging voltage is equal to one half of the direct current voltage, one of the power switching components is connected to the current loop of the resonant circuit. In this case, a voltage borne by the power switching component is only one half of the direct current voltage. When the charging voltage is equal to the direct current voltage, the controller controls two of the power switching components to connect in series to the current loop of the resonant circuit, so that a voltage borne by each power switching component is also one half of the direct current voltage. When the resonant circuit switches from performing charging to performing discharging, and a discharging voltage of the resonant circuit is one half of the direct current voltage, one of the power switching components is first controlled to connect to the current loop of the resonant circuit, and in this case, a voltage borne by the power switching component is only one half of the direct current voltage. When the discharging voltage of the resonant circuit is the direct current voltage, the controller controls two of the power switching components connected in series to connect to the current loop, and in this case, a voltage borne by each power switching component is also one half of the discharging voltage.

In conclusion, by using the direct current converter provided in this embodiment, a voltage borne by the power switching component in the direct current converter during current conversion can be reduced, thereby improving reliability of the direct current converter.

In a possible implementation, the direct current converter further includes a first diode, a second diode, and a first capacitor. A first output end of the three-level power switching circuit is connected to an anode of the first diode and a cathode of the second diode by using the resonant circuit, and a second output end of the power switching circuit is connected to a cathode of the first diode. The cathode of the first diode is connected to a positive output end of the direct current converter, an anode of the second diode is connected to a negative output end of the direct current converter, and the first capacitor is connected in parallel between the positive output end and the negative output end.

When the resonant circuit performs discharging, the first diode and the second diode are used to transfer stored electric power to the first capacitor, so that the first capacitor supplies power to a load at an output end of the direct current converter.

In a possible implementation, the three-level power switching circuit uses a topology of a neutral point clamped three-level conversion circuit. The three-level power switching circuit includes a first bus capacitor, a second bus capacitor, a third diode, a fourth diode, and power switching components T1 to T4. A first terminal of the T1 is connected to a first terminal of the first bus capacitor and a first input end of the three-level power switching circuit, a second terminal of the T1 is connected to a first terminal of the T2 and a cathode of the third diode, a second terminal of the T2 is connected to a first terminal of the T3 and the first output end of the three-level power switching circuit, a second terminal of the T3 is connected to an anode of the fourth diode and a first terminal of the T4, and a second terminal of the T4 is connected to a second output end of the three-level power switching circuit, a switching circuit. A second terminal of the first bus capacitor is connected to an anode of the third diode, a cathode of the fourth diode, and a first terminal of the second bus capacitor.

In a possible implementation, the controller first controls the T4 to be shut off, controls the T2 to be conducted after a first preset time, controls the T3 to be shut off after a second preset time, and controls the T1 to be conducted after a third preset time, so that the resonant circuit switches from performing discharging to performing charging; and first controls the T1 to be shut off, controls the T3 to be conducted after a fourth preset time, controls the T2 to be shut off after a fifth preset time, and controls the T4 to be conducted after a sixth preset time, so that the resonant circuit switches from performing charging to performing discharging.

By performing the foregoing control, in a switching process between charging and discharging performed by the resonant circuit, a voltage borne by each power switching component does not exceed one half of a direct current input voltage.

In a possible implementation, the three-level power switching circuit uses a topology of an active neutral point clamped three-level conversion circuit. The three-level power switching circuit includes a first bus capacitor, a second bus capacitor, and power switching components T1 to T6. A first terminal of the T1 is connected to a first terminal of the first bus capacitor and a first input end of the three-level power switching circuit, a second terminal of the T1 is connected to a first terminal of the T2 and a first terminal of the T5, a second terminal of the T2 is connected to a first terminal of the T3 and a first output end of the three-level power switching circuit, a second terminal of the T3 is connected to a second terminal of the T6 and a first terminal of the T4, and a second terminal of the T4 is connected to a second output end of the three-level power switching circuit, a second terminal of the second bus capacitor, and a second input end of the three-level power switching circuit. A second terminal of the first bus capacitor is connected to a second terminal of the T5, a first terminal of the T6, and a first terminal of the second bus capacitor.

In a possible implementation, the controller is configured to: first control the T4 to be shut off, control the T5 to be shut off and the T6 to be conducted after a first preset time, control the T3 to be shut off and the T2 to be conducted after a second preset time, and control the T1 to be conducted after a third preset time, so that the resonant circuit switches from performing discharging to performing charging; and first control the T1 to be shut off, control the T6 to be shut off and the T5 to be conducted after a fourth preset time, control the T2 to be shut off and the T3 to be conducted after a fifth preset time, and control the T4 to be conducted after a sixth preset time, so that the resonant circuit switches from performing charging to performing discharging.

By performing the foregoing control, in a switching process between charging and discharging performed by the resonant circuit, a voltage borne by each power switching component does not exceed one half of a direct current input voltage.

In a possible implementation, the first preset time is equal to the fourth preset time, the second preset time is equal to the fifth preset time, and the third preset time is equal to the sixth preset time. Duration of each preset time is related to duration of a dead time of power switching components, and the duration of the dead time is related to a specification of the power switching component. For the topology of the neutral point clamped three-level conversion circuit, the T1 and the T4 may use power switching components of the same specification, and the T2 and the T3 use power switching components of the same specification. For the topology of the active neutral point clamped three-level conversion circuit, the T5 and the T6 also need to use power switching components of the same specification.

In some implementations, for ease of type selection and material management, specifications of all power switching components are the same, and in this case, duration of the foregoing preset times is the same.

In a possible implementation, the resonant circuit includes a resonant capacitor and a resonant inductor. A resonant frequency of the resonant circuit is greater than or equal to a switching frequency of the three-level power switching circuit. A resonant period of the resonant circuit may be less than a switching period of power switching components, so that the resonant circuit is able to complete one charging-discharging cycle within each switching period of the power switching component.

In a possible implementation, the controller is further configured to control an output voltage of the direct current converter to be the same as the direct current voltage in magnitude and to be opposite in direction with the direct current voltage.

According to a second aspect, the embodiments may further provide a direct current combiner box, where the direct current combiner box includes a maximum power point tracking function. The direct current combiner box includes the direct current converter provided in the foregoing implementations, and further includes a first direct current-direct current conversion circuit and a second direct current-direct current conversion circuit. An input end of the first direct current-direct current conversion circuit and an input end of the second direct current-direct current conversion circuit are used to connect to different direct current power supplies. A positive output end of the first direct current-direct current conversion circuit is connected to a positive output end of the direct current combiner box, and a negative output end of the first direct current-direct current conversion circuit is connected to an output port zero of the direct current combiner box. A positive output end of the second direct current-direct current conversion circuit is connected to a positive input end of the direct current converter, and a negative output end of the second direct current-direct current conversion circuit is connected to a negative input end of the direct current converter. A positive output end of the direct current converter is connected to the output port zero of the direct current combiner box, and a negative output end of the direct current converter is connected to a negative output end of the direct current combiner box.

The direct current converter of the direct current combiner box uses the resonant circuit to transfer energy, which not only reduces a volume of the direct current converter, but also enables power switching components to work in a soft-switching state. This reduces a switching loss and improves efficiency. In addition, the controller of the direct current converter controls the three-level power switching circuit, which can reduce a voltage borne by the power switching component in the direct current converter during current conversion, thereby improving reliability of the direct current converter.

In a possible implementation, the first direct current-direct current conversion circuit includes at least two first direct current-direct current conversion subcircuits. Input ends of the at least two first direct current-direct current conversion subcircuits are used to connect to different direct current power supplies, positive output ends of the at least two first direct current-direct current conversion subcircuits are used to connect to the positive output end of the first direct current-direct current conversion circuit, and negative output ends of the at least two first direct current-direct current conversion sub circuits are used to connect to the negative output end of the first direct current-direct current conversion circuit.

In a possible implementation, the second direct current-direct current conversion circuit includes at least two second direct current-direct current conversion subcircuits. Input ends of the at least two second direct current-direct current conversion subcircuits are used to connect to different direct current power supplies, positive output ends of the at least two second direct current-direct current conversion subcircuits are used to connect to the positive output end of the second direct current-direct current conversion circuit, and negative output ends of the at least two second direct current-direct current conversion subcircuits are used to connect to the negative output end of the second direct current-direct current conversion circuit.

In a possible implementation, an output voltage of the first direct current-direct current conversion circuit is the same as an output voltage of the second direct current-direct current conversion circuit.

In a possible implementation, the controller is further configured to control the first direct current-direct current conversion circuit and the second direct current-direct current conversion circuit. In other words, the controller of the direct current converter and a controller for the first direct current-direct current conversion circuit and the second direct current-direct current conversion circuit are integrated together.

According to a third aspect, the embodiments may further provide a control method for a direct current converter, which is applied to the direct current converter provided in the foregoing implementations. The method includes the following steps:

controlling power switching components in a three-level power switching circuit, so that when a resonant circuit performs charging or discharging at one half of a direct current voltage, one of the power switching components is connected to a current loop of the resonant circuit, and when the resonant circuit performs charging or discharging at the direct current voltage, two of the power switching components are connected to the current loop of the resonant circuit.

By using the control method, a voltage borne by the power switching component is one half of a direct current voltage at an input end when the direct current converter performs current conversion. This reduces the voltage borne by the power switching component and improves reliability of the direct current converter.

In a possible implementation, the three-level power switching circuit uses a topology of a neutral point clamped three-level conversion circuit described in the foregoing implementation, and in this case, the controlling power switching components in a three-level power switching circuit includes:

first controlling a T4 to be shut off, controlling a T2 to be conducted after a first preset time, controlling a T3 to be shut off after a second preset time, and controlling a T1 to be conducted after a third preset time, so that the resonant circuit switches from performing discharging to performing charging; and first controlling the T1 to be shut off, controlling the T3 to be conducted after a fourth preset time, controlling the T2 to be shut off after a fifth preset time, and controlling the T4 to be conducted after a sixth preset time, so that the resonant circuit switches from performing charging to performing discharging.

In a possible implementation, the three-level power switching circuit uses a topology of an active neutral point clamped three-level conversion circuit, and in this case, the controlling power switching components in a three-level power switching circuit includes:

first controlling a T4 to be shut off, controlling a T5 to be shut off and a T6 to be conducted after a first preset time, controlling a T3 to be shut off and a T2 to be conducted after a second preset time, and controlling a T1 to be conducted after a third preset time, so that the resonant circuit switches from performing discharging to performing charging; and first controlling the T1 to be shut off, controlling the T6 to be shut off and the T5 to be conducted after a fourth preset time, controlling the T2 to be shut off and the T3 to be conducted after a fifth preset time, and controlling the T4 to be conducted after a sixth preset time, so that the resonant circuit switches from performing charging to performing discharging.

In a possible implementation, the first preset time is equal to the fourth preset time, the second preset time is equal to the fifth preset time, and the third preset time is equal to the sixth preset time. Duration of each preset time is related to duration of a dead time of power switching components, and the duration of the dead time is related to a specification of the power switching component. For the topology of the neutral point clamped three-level conversion circuit, the T1 and the T4 may use power switching components of the same specification, and the T2 and the T3 use power switching components of the same specification. For the topology of the active neutral point clamped three-level conversion circuit, the T5 and the T6 also need to use power switching components of the same specification.

In a possible implementation, a resonant frequency of the resonant circuit is greater than or equal to a switching frequency of the three-level power switching circuit. A resonant period of the resonant circuit may be less than a switching period of power switching components, so that the resonant circuit can complete one charging-discharging cycle within each switching period of the power switching component.

According to a fourth aspect, the embodiments may further provide a photovoltaic power generation system, including the direct current combiner box provided in the foregoing implementations, and further including a photovoltaic string and a photovoltaic inverter. The photovoltaic string includes at least one photovoltaic module, the photovoltaic string is configured to convert light energy into a direct current, and an input end of the first direct current-direct current conversion circuit and an input end of the second direct current-direct current conversion circuit are separately connected to at least one photovoltaic string. A positive output end of the direct current combiner box is used to connect to a positive input end of the photovoltaic inverter, a negative output end of the direct current combiner box is used to connect to a negative input end of the photovoltaic inverter, and an output port zero of the direct current combiner box is used to connect to an input port zero of the photovoltaic inverter. The photovoltaic inverter is configured to convert a direct current input by the direct current combiner box into an alternating current.

The direct current converter of the photovoltaic power generation system uses the resonant circuit to transfer energy, which not only reduces a volume of the direct current converter, but also enables power switching components to work in a soft-switching state. This reduces a switching loss and improves efficiency. In addition, the controller of the direct current converter controls the three-level power switching circuit, so that when the resonant circuit switches between performing a charging process and performing a discharging process, a voltage borne by the power switching component in the direct current converter can be reduced, thereby improving reliability of the direct current converter, and further improving reliability of the photovoltaic power generation system.

BRIEF DESCRIPTION OF THE DRAWINGS

FIG. 12 is a flowchart of a control method for a direct current converter according to an embodiment.

DETAILED DESCRIPTION OF THE EMBODIMENTS

To make persons skilled in the art better understand the embodiments, the following first describes an application scenario.

An application scenario of a direct current converter may be a distributed photovoltaic power generation system, that is, a photovoltaic power generation system based on a centralized inverter and a maximum power point tracking (MPPT) boost combiner box. Details are described below.

Figure 2:
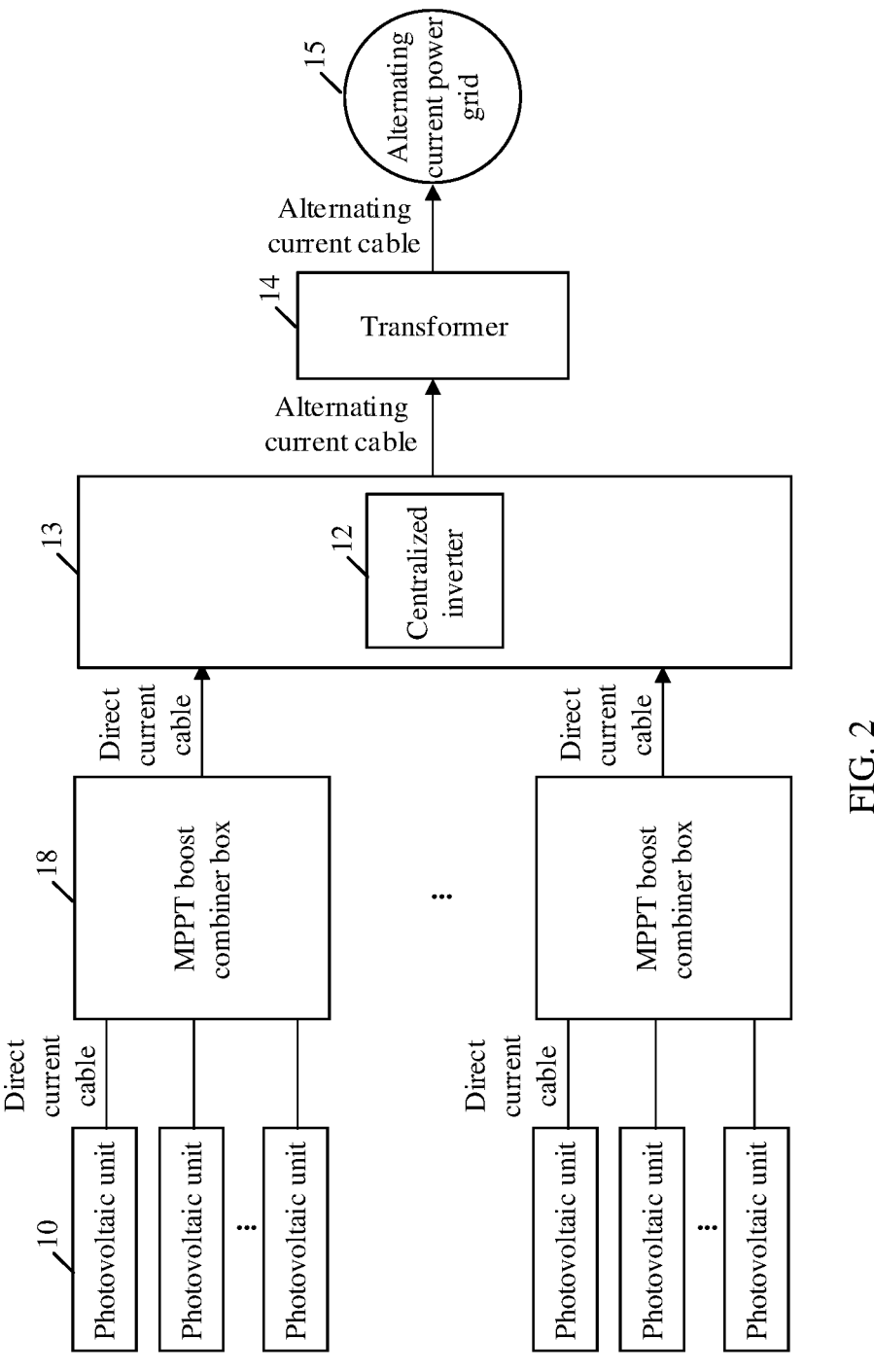
FIG. 2 is a schematic diagram of a photovoltaic power generation system based on a centralized inverter and an MPPT boost combiner box.

FIG. 2 is a schematic diagram of a photovoltaic power generation system based on a centralized inverter and an MPPT boost combiner box.

The photovoltaic power generation system in the figure includes a photovoltaic unit 10, an MPPT boost combiner box 18, a centralized inverter 12, and a transformer 14.

Each photovoltaic unit 10 includes one or more photovoltaic modules. The photovoltaic module is a direct current power supply composed of solar cells packaged in series and in parallel.

When the photovoltaic unit 10 includes a plurality of photovoltaic modules, the plurality of photovoltaic modules may form one photovoltaic string in a manner in which a positive electrode and a negative electrode are connected in series in a head-to-tail manner, to form the photovoltaic unit 10. The plurality of photovoltaic modules may be first connected in series to form a plurality of photovoltaic strings, and the plurality of photovoltaic strings are then connected in parallel to form the photovoltaic unit 10.

The MPPT boost combiner box 18, briefly referred to as a direct current combiner box, is a boost converter configured to perform direct current (Direct Current, DC)-direct current conversion.

The centralized inverter 12 is configured to convert, into alternating current output, direct current input that is from a single channel or a plurality of channels connected in parallel and that is connected to a direct current side. DC-AC single-stage power conversion may be used. Alternating current output by the centralized inverter 12 is fed into an alternating current power grid 15 through the transformer 14.

The centralized inverter 12 may be far away from the photovoltaic unit 10 in electrical distance and may be located in an outdoor cabinet or integrated in an outdoor modular manner. For example, the centralized inverter 12 is disposed in a cabinet 13.

Figure 1:
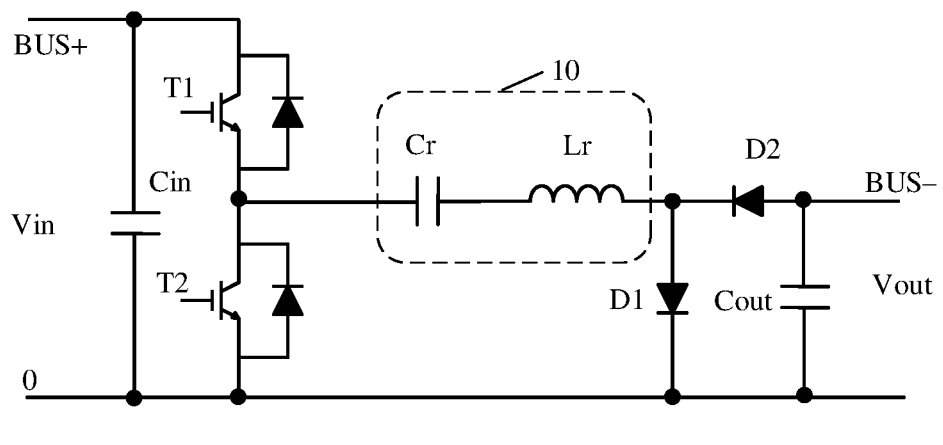
FIG. 1 is a schematic diagram of a direct current converter using a two-level RSC circuit.

A direct current converter used in the MPPT boost combiner box 18 may use the two-level RSC circuit shown in FIG. 1. Power switching components T1 and T2 are complementarily conducted. When the T1 is conducted and the T2 is shut off, a capacitor Cin charges a resonant capacitor Cr. When the T2 is conducted and the T1 is shut off, the resonant capacitor Cr charges a capacitor Cout. When the two-level RSC circuit works, a magnitude of a maximum voltage stress borne by each of the T1 and the T2 is a direct current voltage. Therefore, power switching components with a relatively high voltage withstand specification needs to be selected. This increases hardware costs on one hand, and on the other hand, reduces reliability of the direct current converter because the power switching component works at a relatively high voltage for a long time.

To resolve the foregoing problem, the embodiments may provide a direct current converter, a control method, a direct current combiner box, and a photovoltaic power generation system, so as to enable a voltage borne by power switching components in the direct current converter during current conversion to be one half of a direct current voltage. This reduces the voltage borne by the power switching component and improves reliability of the direct current converter in comparison with an existing solution.

The following describes the embodiments in detail with reference to the accompanying drawings.

The terms "first", "second", and the like in the following descriptions are used only for a description purpose and cannot be understood as indicating or implying relative importance or implicitly indicating a quantity of indicated features.

Unless otherwise expressly specified and limited, the term "connect" should be understood in a broad sense. For example, a "connection" may be a fixed connection, may be a detachable connection, or may be connection to form a whole; and may be a direct connection, or an indirect connection through an intermediate medium.

A direct current converter provided in the following embodiments may be applied not only to a photovoltaic power generation system, but also to an electric vehicle and another renewable energy system. This is not limited in the embodiments.

A current conversion process in the following descriptions is a process in which a resonant circuit switches from performing charging to performing discharging and a process in which the resonant circuit switches from performing discharging to performing charging.

Figure 3:
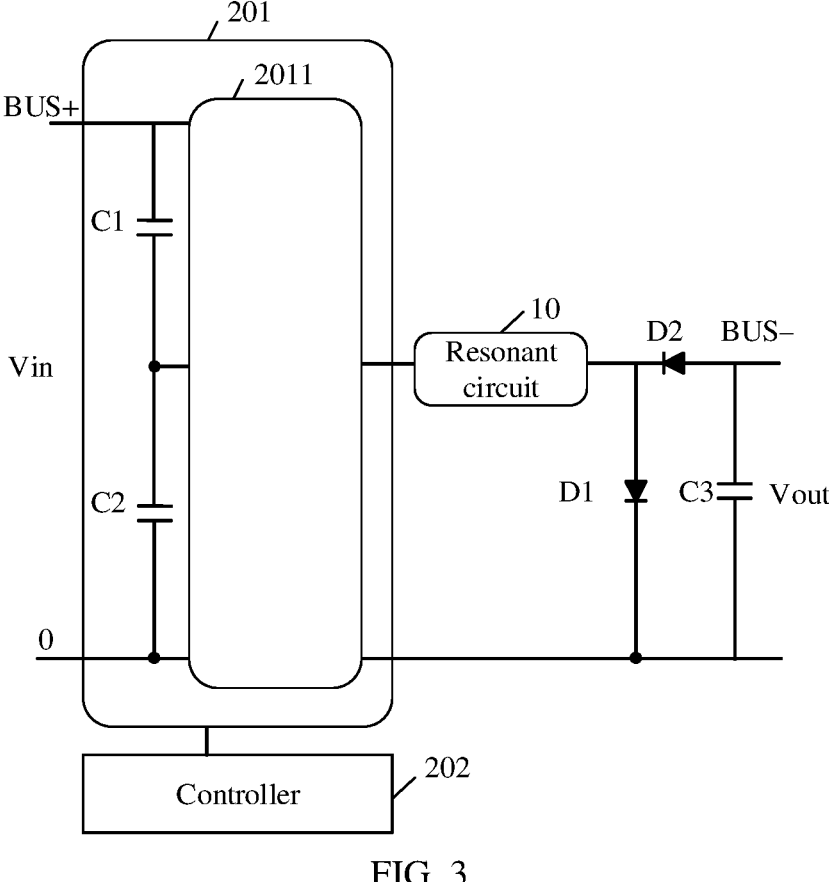
FIG. 3 is a schematic diagram of a direct current converter according to an embodiment.

FIG. 3 is a schematic diagram of a direct current converter according to an embodiment.

The direct current converter in the figure includes a three-level power switching circuit 201, a resonant circuit 10, a first diode D1, a second diode D2, a first capacitor C3, and a controller 202.

A first input end of the three-level power switching circuit 201 is a positive input end (corresponding to a BUS+ terminal in the figure) of the direct current converter, and a second input end of the three-level power switching circuit 201 is a negative input end (corresponding to a 0 terminal in the figure) of the direct current converter. A first output end of the three-level power switching circuit 201 is connected to an anode of the first diode D1 and a cathode of the second diode D2 through the resonant circuit 10, and a second output end of the three-level power switching circuit 201 is connected to a cathode of the first diode D1.

The cathode of the first diode D1 is connected to a positive output end of the direct current converter, an anode of the second diode D2 is connected to a negative output end (corresponding to a BUS—terminal in the figure) of the direct current converter, and the first capacitor C3 is connected in parallel between the positive output end and the negative output end.

An input end of the three-level power switching circuit 201 is used to connect to a direct current voltage.

An implementation of the three-level power switching circuit 201 is described below.

The three-level power switching circuit 201 includes a first bus capacitor C1, a second bus capacitor C2, and a controllable switching circuit 2011. A first terminal of the first bus capacitor C1 is connected to a positive input end of the direct current converter and the controllable switching circuit 2011, and a second terminal of the first bus capacitor C1 is connected to a middle point of a bus capacitor. A first terminal of the second bus capacitor C2 is connected to the middle point of the bus capacitor, and a second terminal of the second bus capacitor C2 is connected to a negative input end of the direct current converter and the controllable switching circuit 2011. The middle point of the bus capacitor is connected to the controllable switching circuit 2011.

The controllable switching circuit 2011 includes power switching components. A type of the power switching component is not limited in this embodiment. For example, the power switching component is an insulated gate bipolar transistor IGBT), a metal oxide semiconductor field effect transistor (MOSFET), or a silicon carbide metal oxide semiconductor (SiC MOSFET).

The controller 202 may send a control signal to each power switching component to control a working state of the power switching component.

In some embodiments, the control signal is a pulse width modulation (PWM) signal.

The controller 202 may be an application-specific integrated circuit (ASIC), a programmable logic device (PLD), a digital signal processor (DSP), or a combination thereof. The PLD may be a complex programmable logic device (CPLD), a field-programmable gate array (FPGA), generic array logic (GAL), or any combination thereof. This is not limited in this embodiment.

The direct current converter provided in this embodiment is a resonant switched-capacitor converter, and energy is transferred by using the resonant circuit 10 (including a resonant inductor and a resonant capacitor). There may be a charging process and a discharging process for the resonant circuit 10. The charging process means that the controller 202 controls the controllable switching circuit 2011, so that the first bus capacitor C1 and the second bus capacitor C2 transfer energy to the resonant circuit 10. The discharging process means that the controller 202 controls the controllable switching circuit 2011, so that the resonant circuit 10 transfers energy to the first capacitor C3, and the first capacitor C3 provides an output voltage.

The controller controls the three-level power switching circuit, so that when the resonant circuit switches from performing discharging to performing charging, and a charging voltage is equal to one half of the direct current voltage, in this case, only one of the first bus capacitor C1 and the second bus capacitor C2 charges the resonant circuit 10, and one of the power switching components is connected to a current loop of the resonant circuit. In this case, a voltage borne by the power switching component is only one half of the direct current voltage. When the charging voltage is equal to the direct current voltage, in this case, the first bus capacitor C1 and the second bus capacitor C2 charge the resonant circuit 10, and the controller controls two of the power switching components to connect in series to the current loop of the resonant circuit, so that a voltage borne by each power switching component is also one half of the direct current voltage.

When the resonant circuit switches from performing charging to performing discharging, and a discharging voltage is one half of the direct current voltage, that is, when the resonant circuit 10 and one bus capacitor are connected in series to the current loop, in this case, a voltage borne by power switching components is equal to a voltage formed by discharging of the resonant circuit minus voltages at both terminals of the bus capacitor. The controller first controls one of the power switching components to connect to the current loop of the resonant circuit, and in this case, a voltage borne by the power switching component is only one half of the direct current voltage. When the discharging voltage is equal to the direct current voltage, the controller controls two of the power switching components connected in series to connect to the current loop, and in this case, a voltage borne by each power switching component is also one half of the discharging voltage.

In conclusion, by using the direct current converter provided in this embodiment, a voltage borne by the power switching component in the direct current converter during current conversion can be one half of the direct current voltage. This reduces a voltage borne by power switching components and improves reliability of the direct current converter in comparison with an existing solution.

The following describes a working principle of the direct current converter with reference to an implementation. In the following embodiments, an example in which power switching components is an NMOS transistor is used for description. In the following description, a first terminal of the power switching component is a drain electrode of the NMOS transistor, and a second terminal of the power switching component is a source electrode of the NMOS transistor. The controller 202 is configured to send a control signal to a gate electrode to control an on/off state of the power switching component. When the control signal is at a high level, the power switching component is conducted. When the control signal is at a low level, the power switching component is shut off.

A working principle of a neutral point clamped (NPC) three-level resonant switched-capacitor converter is first described below.

Figure 4:
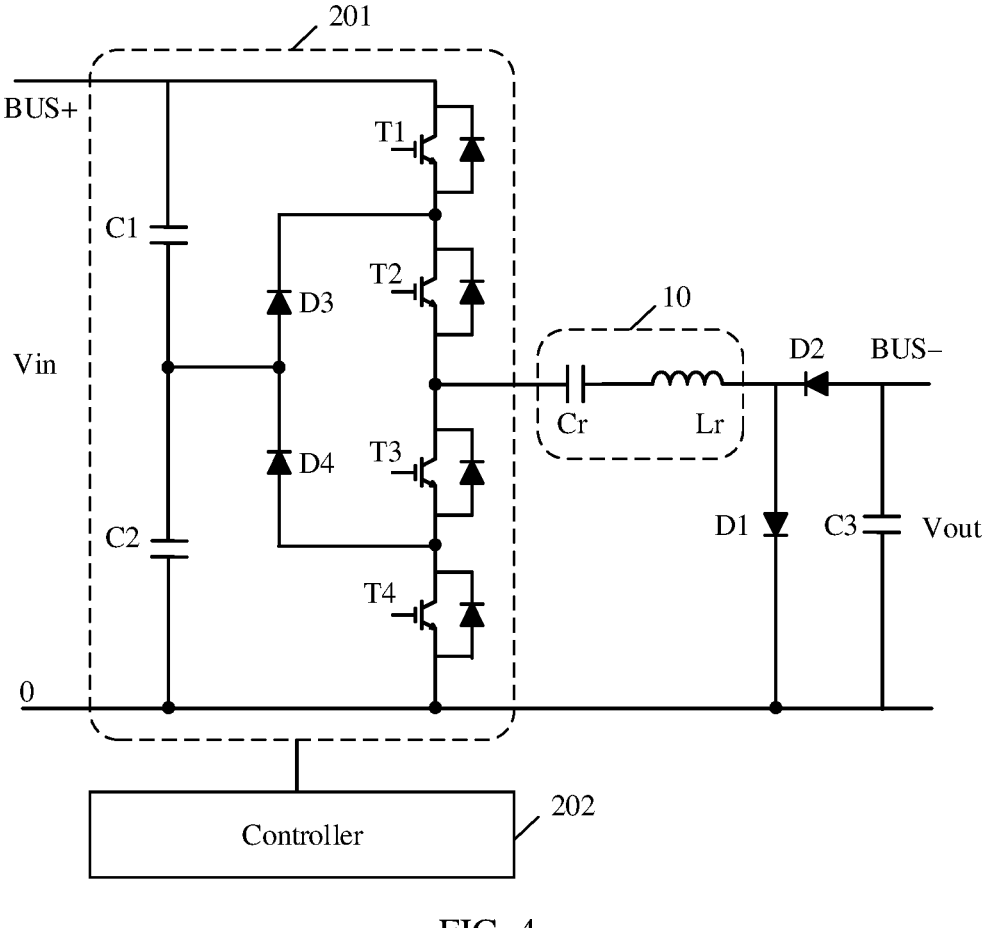
FIG. 4 is a schematic diagram of a neutral point clamped three-level resonant switched-capacitor converter according to an embodiment.

FIG. 4 is a schematic diagram of a neutral point clamped three-level resonant switched-capacitor converter according to an embodiment.

A three-level power switching circuit 201 of a direct current converter in the figure includes a first bus capacitor C1, a second bus capacitor C2, a third diode D3, a fourth diode D4, and power switching components T1 to T4.

A first terminal of the T1 is connected to a first terminal of the first bus capacitor C1 and a first input end of the three-level power switching circuit 201, a second terminal of the T1 is connected to a first terminal of the T2 and a cathode of the third diode D3, and a second terminal of the T2 is connected to a first terminal of the T3 and a first output end of the three-level power switching circuit 201. A second terminal of the T3 is connected to an anode of the fourth diode D4 and a first terminal of the T4, and a second terminal of the T4 is connected to a second output end of the three-level power switching circuit 201, a second terminal of the second bus capacitor C2, and a second input end of the three-level power switching circuit 201.

A second terminal of the first bus capacitor C1 is connected to an anode of the third diode D3, a cathode of the fourth diode D4, and a first terminal of the second bus capacitor C2.

A resonant circuit 10 includes a resonant capacitor Cr and a resonant inductor Lr. A resonant frequency of the resonant circuit 10 is greater than or equal to a switching frequency of power switching components. A resonant period of the resonant circuit 10 may be less than a switching period of the power switching component, so that the resonant circuit 10 is able to complete one charging-discharging cycle within each switching period of the power switching component.

A control process of the controller 202 is described in detail below.

Figure 5:
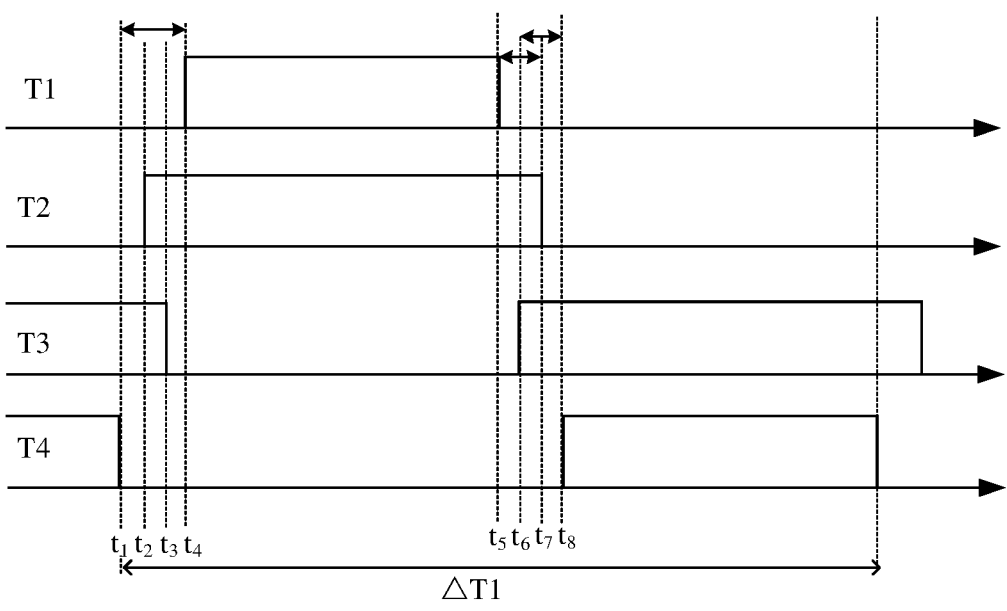
FIG. 5 is a sequence diagram of a control signal corresponding to FIG. 4 according to an embodiment.

FIG. 5 is a sequence diagram of a control signal corresponding to FIG. 4 according to an embodiment.

When a discharging mode is switched to a charging mode, a $T_4$ is shut off at a time $t_1$, then a $T_2$ is conducted at a time $t_2$, then a $T_3$ is shut off at a time $t_3$, and then a $T_1$ is conducted at a time $t_4$.

When the charging mode is switched to the discharging mode, the $T_1$ is shut off at a time $t_5$, then the $T_3$ is conducted at a time $t_6$, then the $T_2$ is shut off at a time $t_7$, and then the $T_4$ is conducted at a time $t_8$.

In the foregoing control manner, a stress borne by a power semiconductor component may be controlled to be always one half of a bus voltage during circuit current conversion, so that overstress of the power semiconductor component may be avoided, and reliability of the direct current converter is improved. Detailed description is provided below with reference to a working state of the direct current converter.

FIG. 6A to FIG. 6H are state diagrams of a neutral point clamped three-level resonant switched-capacitor converter.

When the resonant circuit 10 switches from a discharging state to a charging state, the $T_4$ is shut off first at the time $t_1$, the $T_1$ and the $T_2$ are controlled to be in a shut-off state, and the $T_3$ is in a conducting state. For the state diagram, refer to FIG. 6A. Direct current input charges the C1 and the C2.

Then, the $T_2$ is conducted at the time $t_2$, the $T_1$ and the $T_4$ are kept in a shut-off state, and the $T_3$ is kept in a conducting state. For the state diagram, refer to FIG. 6B. The second bus capacitor C2 charges the resonant circuit through a loop shown by a dashed line in the figure. In this case, a voltage borne by the $T_2$ is approximately an output voltage of the C2. In actual application, a specification of the C1 may be the same as a specification of the C2. The voltage borne by the $T_2$ may be approximately one half of a direct current voltage.

In some embodiments, the time $t_2$ is separated from the time $t_1$ by a first preset time, and duration of the first preset time is greater than or equal to the duration of a dead time (Dead time) of the $T_4$.

Figure 6A:
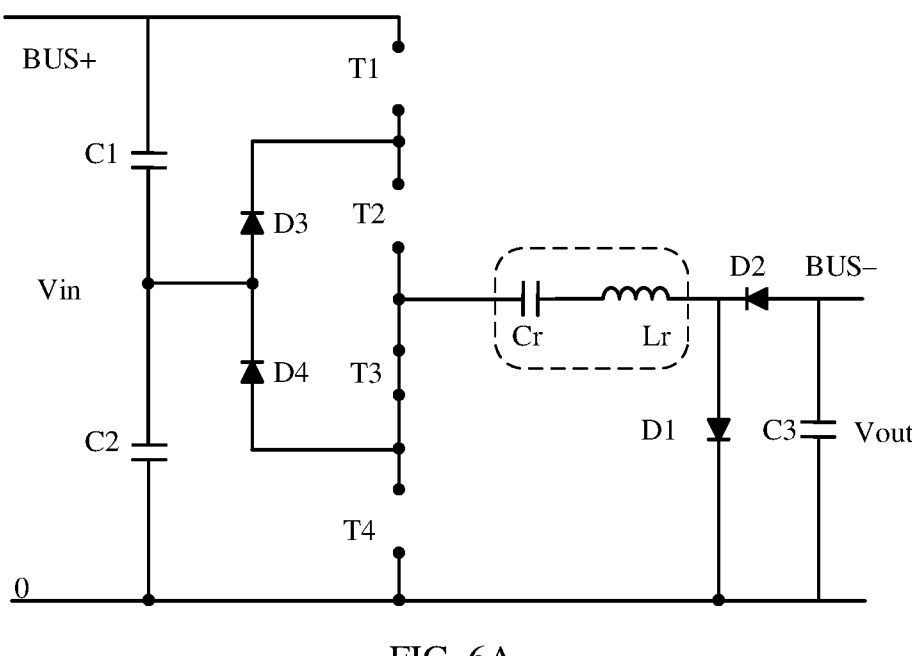
FIG. 6A is a state diagram 1 of a neutral point clamped three-level resonant switched-capacitor converter according to an embodiment.
Figure 6B:
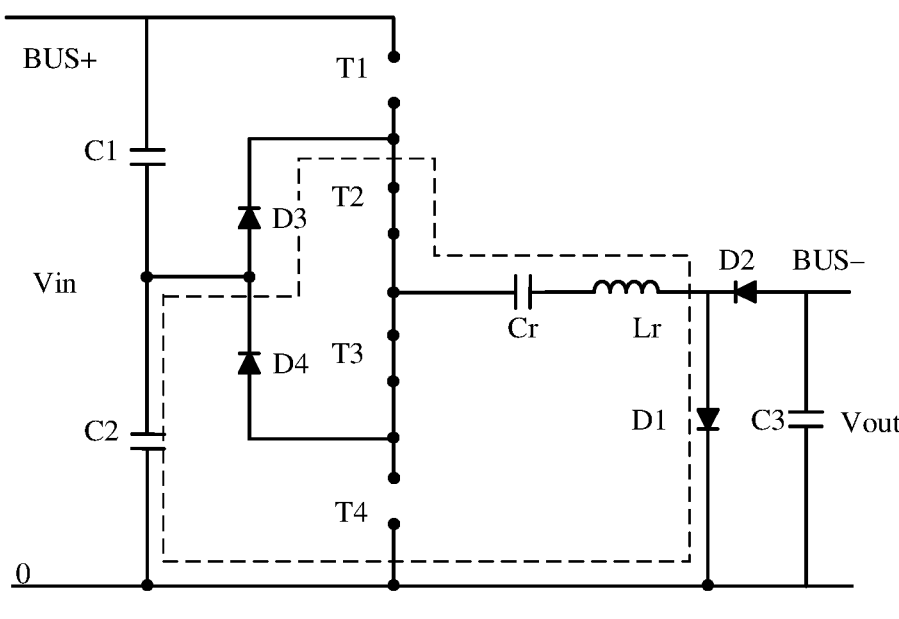
FIG. 6B is a state diagram 2 of a neutral point clamped three-level resonant switched-capacitor converter according to an embodiment.
Figure 6C:
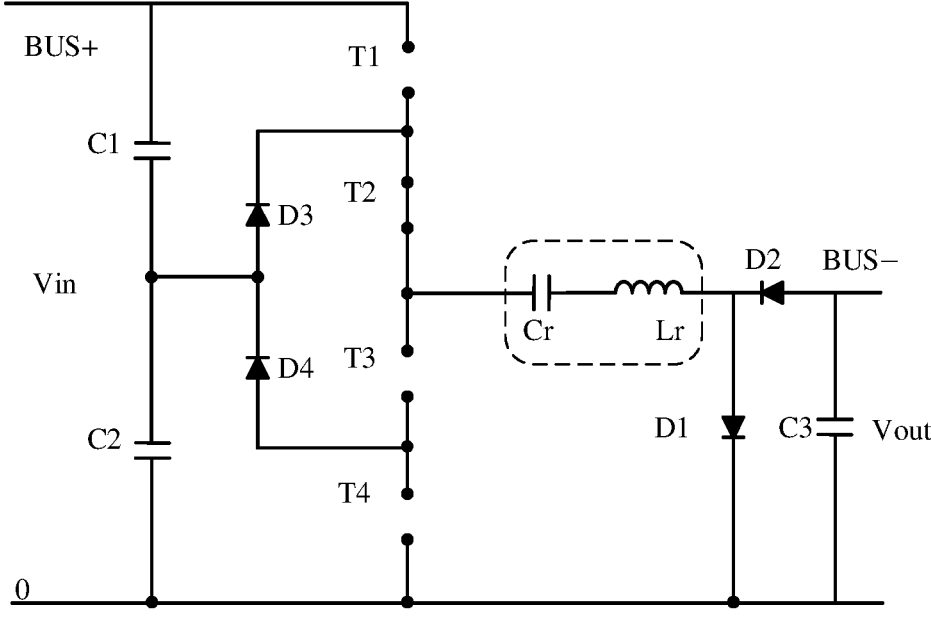
FIG. 6C is a state diagram 3 of a neutral point clamped three-level resonant switched-capacitor converter according to an embodiment.

Then, the $T_3$ is shut off at the time $t_3$, the $T_1$ and the $T_4$ are kept in a shut-off state, and the $T_2$ is kept in a conducting state. Referring to FIG. 6C, in this case, the second bus capacitor C2 continues to charge the resonant circuit.

In some embodiments, the time $t_3$ is separated from the time $t_2$ by a second preset time, and duration of the second preset time is greater than or equal to a dead time of the $T_2$.

Figure 6D:
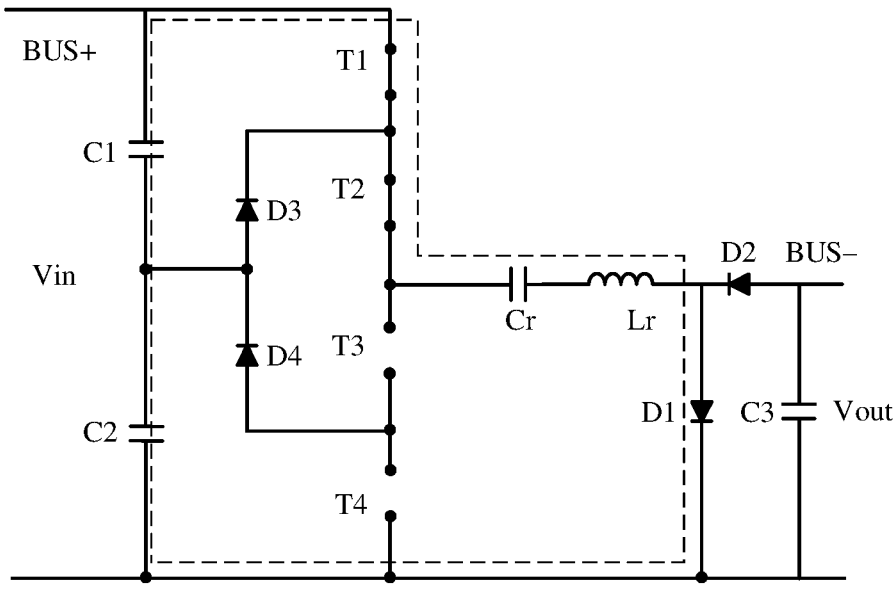
FIG. 6D is a state diagram 4 of a neutral point clamped three-level resonant switched-capacitor converter according to an embodiment.

Then, the $T_1$ is conducted at the time $t_4$, the $T_3$ and the $T_4$ are kept in a shut-off state, and the $T_2$ is kept in a conducting state. Referring to FIG. 6D, in this case, the first bus capacitor C1 and the second bus capacitor C2 charge the resonant circuit through a loop shown by a dashed line in the figure. The $T_1$ and the $T_2$ are connected in series to the loop, and in this case, a voltage borne by each of the $T_1$ and the $T_2$ is approximately one half of the direct current voltage.

In some embodiments, the time $t_4$ is separated from time $t_3$ by a third preset time, and duration of the third preset time is greater than or equal to a dead time of the $T_3$.

Figure 6E:
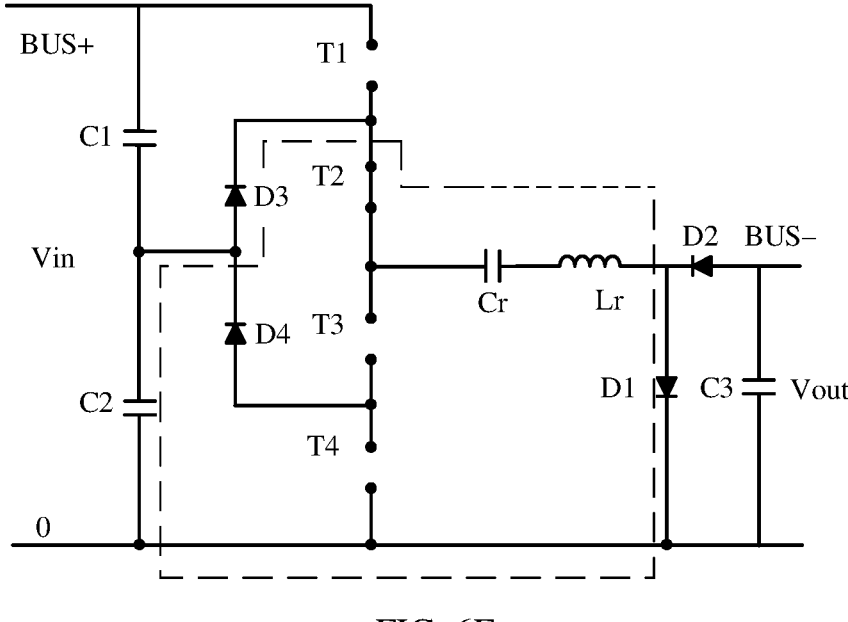
FIG. 6E is a state diagram 5 of a neutral point clamped three-level resonant switched-capacitor converter according to an embodiment.

After charging of the resonant circuit is completed, the resonant circuit discharges a first capacitor C3. In this case, the $T_1$ is shut off first at the time $t_5$, the $T_3$ and the $T_4$ are kept in a shut-off state, and the $T_2$ is kept in a conducting state. Referring to FIG. 6E, in this case, when a discharging voltage of the resonant circuit is greater than voltages at both terminals of the second bus capacitor C2, discharging is performed through a loop shown by a dashed line in the figure. In this case, a maximum voltage borne by the $T_2$ is approximately one half of the direct current voltage.

Figure 6F:
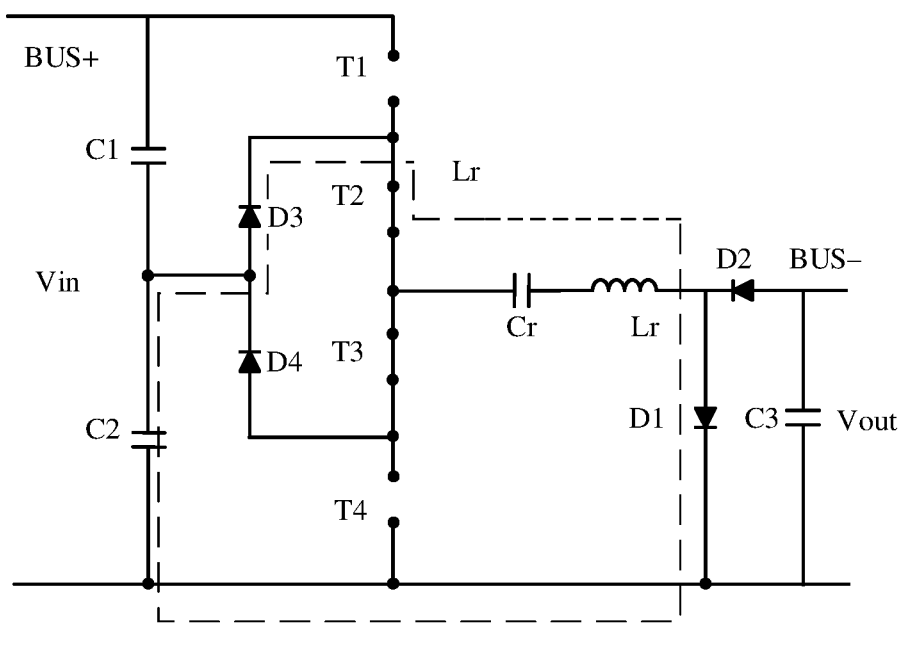
FIG. 6F is a state diagram 6 of a neutral point clamped three-level resonant switched-capacitor converter according to an embodiment.

Then, the controller controls the $T_3$ to be conducted at the time $t_6$, the $T_1$ and the $T_4$ are kept in a shut-off state, and the $T_2$ is kept in a conducting state. Referring to FIG. 6F, in this case, when the discharging voltage of the resonant circuit is greater than the voltages at both terminals of the second bus capacitor C2, discharging is performed through a loop shown by a dashed line in the figure. In this case, a voltage borne by the $T_2$ is approximately one half of the direct current voltage.

In some embodiments, the time $t_6$ is separated from time $t_5$ by a fourth preset time, and duration of the fourth preset time is greater than or equal to a dead time of the $T_1$.

Figure 6G:
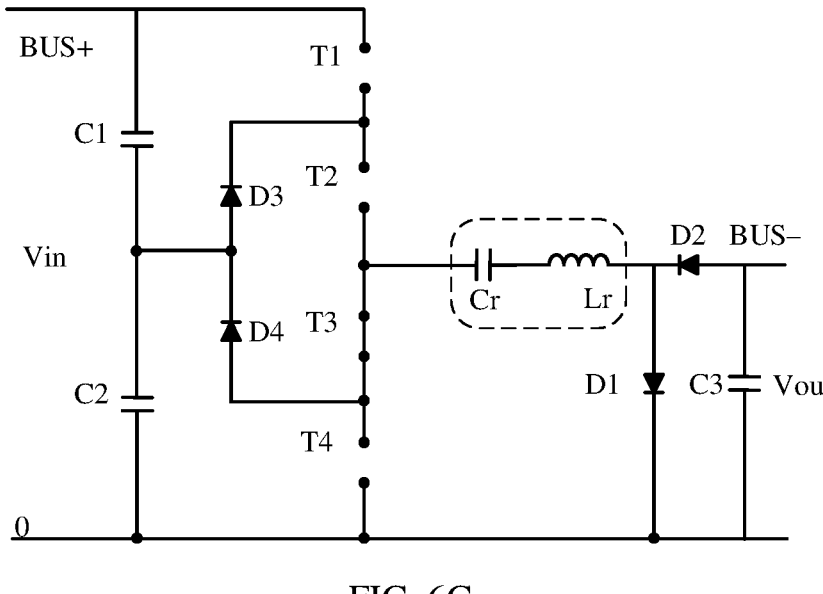
FIG. 6G is a state diagram 7 of a neutral point clamped three-level resonant switched-capacitor converter according to an embodiment.

Then, the controller controls the $T_2$ to be shut off at the time $t_7$, the $T_1$ and the $T_4$ are kept in a shut-off state, and the $T_3$ is kept in a conducting state. Referring to FIG. 6G, in this case, the resonant circuit is configured to store energy.

In some embodiments, the time $t_7$ is separated from time $t_6$ by a fifth preset time, and duration of the fifth preset time is greater than or equal to a dead time of the $T_3$.

Figure 6H:
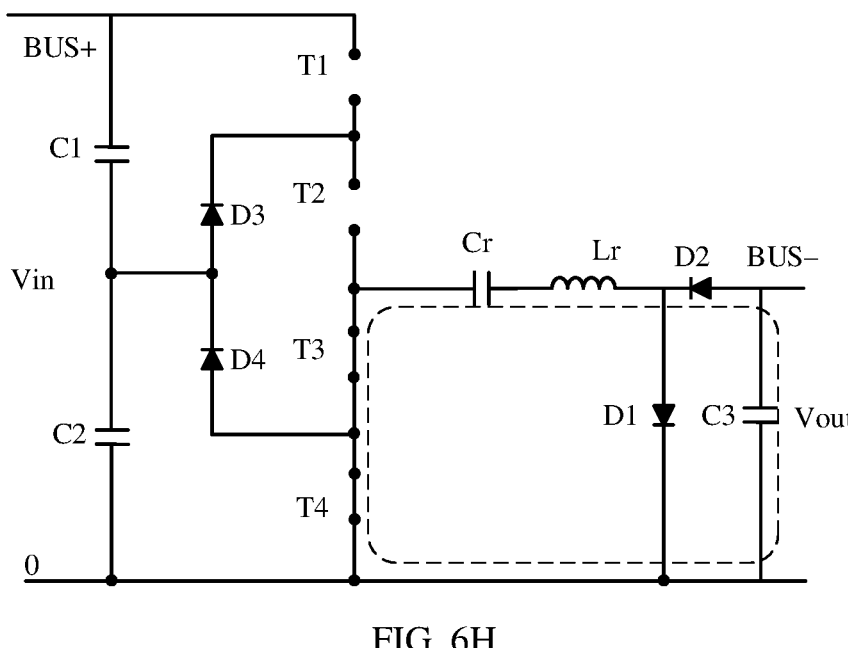
FIG. 6H is a state diagram 8 of a neutral point clamped three-level resonant switched-capacitor converter according to an embodiment.

Then, the controller controls the $T_4$ to be conducted at the time $t_8$, the $T_1$ and the $T_2$ are kept in a shut-off state, and the $T_3$ is kept in a conducting state. Referring to FIG. 6H, in this case, a current loop of the resonant circuit is shown by a dashed line in the figure, and voltages at both terminals of each of the $T_3$ and the $T_4$ do not exceed one half of the direct current voltage.

In some embodiments, the time $t_8$ is separated from the time $t_7$ by a sixth preset time, and duration of the sixth preset time is greater than or equal to a dead time of the $T_2$.

In conclusion, by using the direct current converter provided in this embodiment, a voltage borne by power switching components in the direct current converter during current conversion can be reduced, thereby improving reliability of the direct current converter.

In some embodiments, the T1 and the T4 are power switching components with a same specification, and the T2 and the T3 are power switching components with a same specification. In this case, the first preset time is equal to the fourth preset time, the second preset time is equal to the fifth preset time, and the third preset time is equal to the sixth preset time.

In some other embodiments, specifications of the power switching components T1 to T4 are the same. In this case, the first preset time to the sixth preset time the same.

A working principle of an active neutral point clamped (ANPC) three-level resonant switched-capacitor converter is described below.

Figure 7:
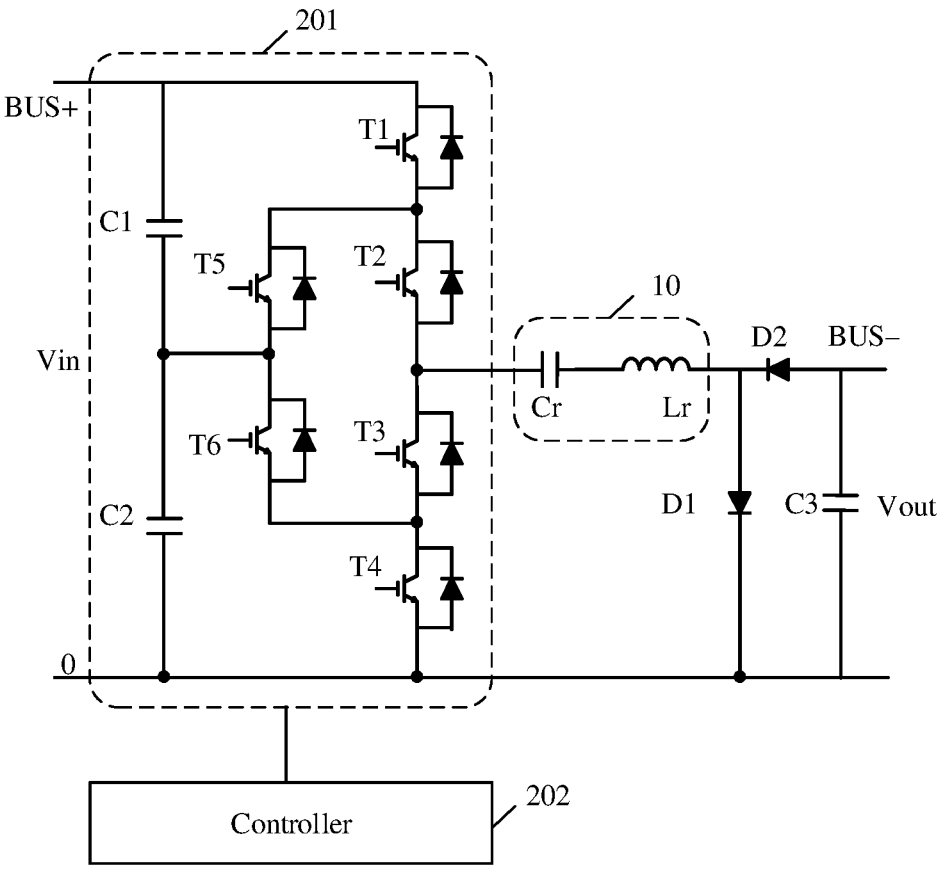
FIG. 7 is a schematic diagram of an active neutral point clamped three-level resonant switched-capacitor converter according to an embodiment.

FIG. 7 is a schematic diagram of an active neutral point clamped three-level resonant switched-capacitor converter according to an embodiment.

A three-level power switching circuit 201 includes a first bus capacitor C1, a second bus capacitor C2, and power switching components T1 to T6.

A first terminal of the T1 is connected to a first terminal of the first bus capacitor C1 and a first input end of the three-level power switching circuit 201, a second terminal of the T1 is connected to a first terminal of the T2 and a first terminal of the T5, a second terminal of the T2 is connected to a first terminal of the T3 and a first output end of the three-level power switching circuit 201, a second terminal of the T3 is connected to a second terminal of the T6 and a first terminal of the T4, and a second terminal of the T4 is connected to a second output end of the three-level power switching circuit 201, a second terminal of the second bus capacitor C2, and a second input end of the three-level power switching circuit 201.

A second terminal of the first bus capacitor C1 is connected to a second terminal of the T5, a first terminal of the T6, and a first terminal of the second bus capacitor C2.

A resonant circuit 10 includes a resonant capacitor Cr and a resonant inductor Lr. A resonant frequency of the resonant circuit 10 is greater than or equal to a switching frequency of power switching components. A resonant period of the resonant circuit 10 may be less than a switching period of the power switching component, so that the resonant circuit 10 is able to complete one charging-discharging cycle within each switching period of the power switching component.

A control process of the controller 202 is described in detail below.

Figure 8:
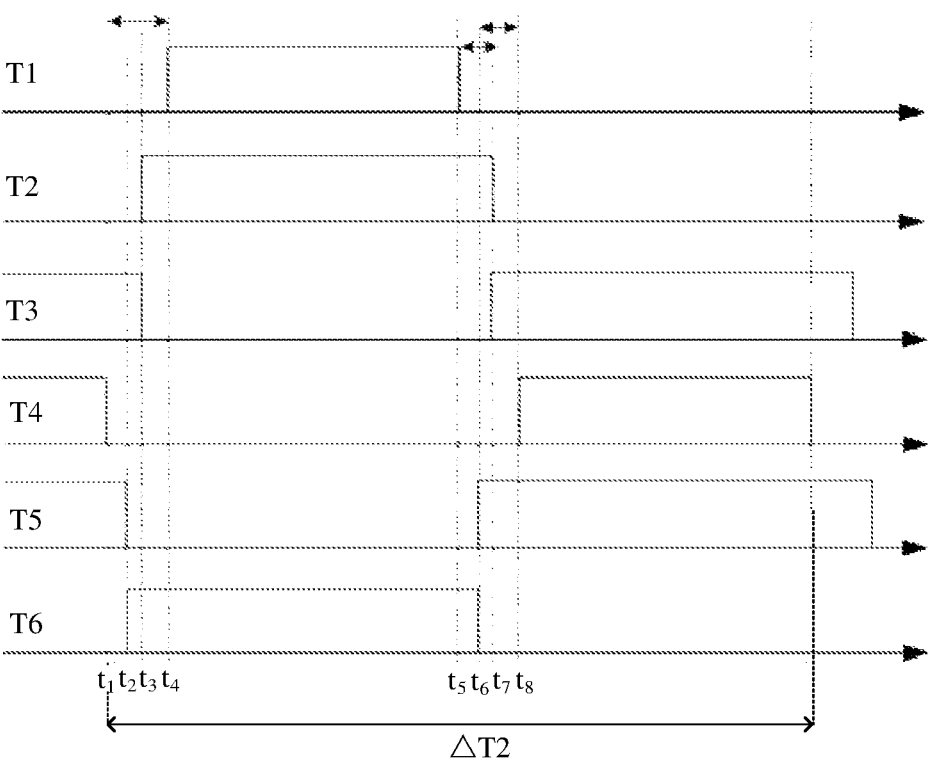
FIG. 8 is a sequence diagram of a control signal corresponding to FIG. 7 according to an embodiment.

FIG. 8 is a sequence diagram of a control signal corresponding to FIG. 7 according to an embodiment.

When a discharging mode is switched to a charging mode, a $T_4$ is shut off at a time $t_1$, then a $T_5$ is shut off and a $T_6$ is conducted at a time $t_2$, then a $T_3$ is shut off and a $T_2$ is conducted at a time $t_3$, and then a $T_1$ is conducted at a time $t_4$.

When the charging mode is switched to the discharging mode, the $T_1$ is shut off at a time $t_5$, then the $T_6$ is shut off and the $T_5$ is conducted at a time $t_6$, then the $T_2$ is shut off and the $T_3$ is conducted at a time $t_7$, and then the $T_4$ is conducted at a time $t_8$.

In the foregoing control manner, a stress borne by a power semiconductor component may be controlled to be always one half of a bus voltage during circuit current conversion, so that overstress of the power semiconductor component may be avoided, and reliability of the direct current converter is improved. Detailed description is provided below with reference to a working state of the direct current converter.

FIG. 9A to FIG. 9H are state diagrams of an ANPC three-level resonant switched-capacitor converter.

Figure 9A:
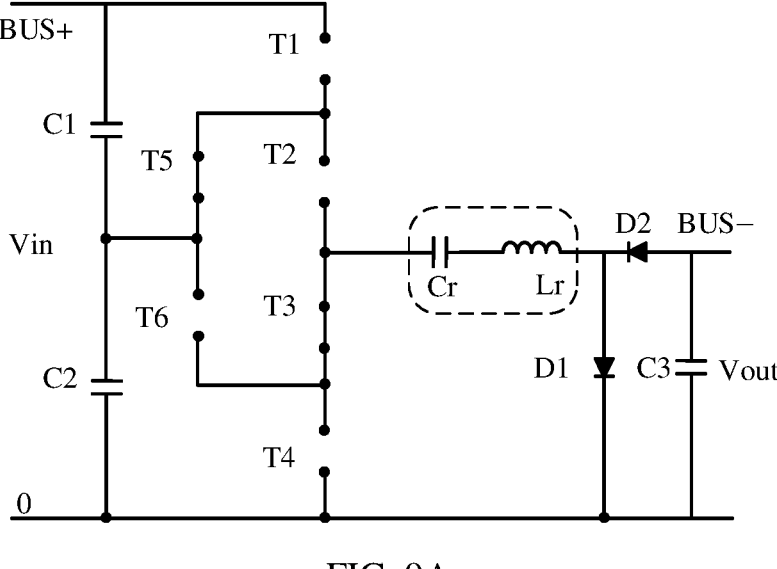
FIG. 9A is a state diagram 1 of an ANPC three-level resonant switched-capacitor converter according to an embodiment.

When the resonant circuit 10 switches from a discharging state to a charging state, the $T_4$ is first switched to a shut-off state at the time $t_1$; the $T_1$, the $T_2$, and the $T_6$ are kept in a shut-off state; and the $T_3$ and the $T_5$ are kept in a conducting state. Referring to FIG. 9A, in this case, direct current input charges the C1 and the C2.

Figure 9B:
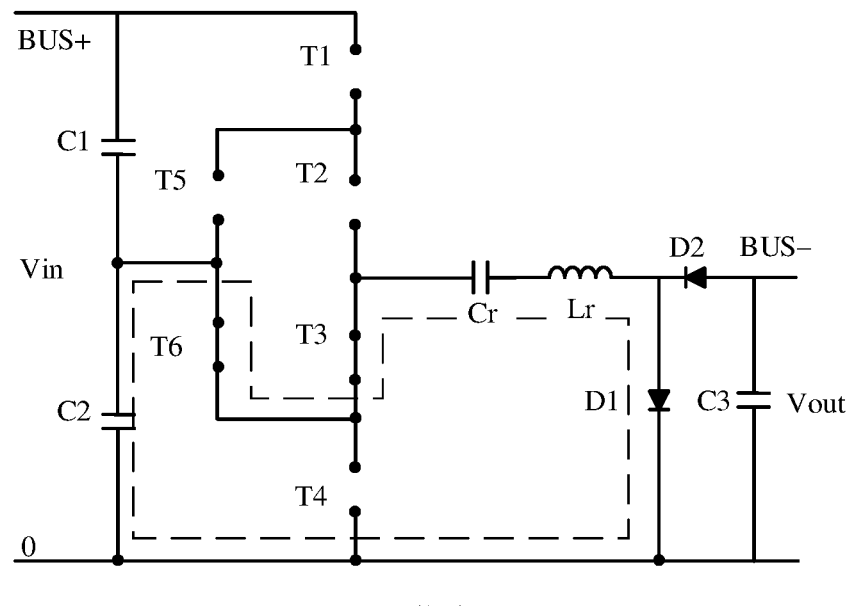
FIG. 9B is a state diagram 2 of an ANPC three-level resonant switched-capacitor converter according to an embodiment.

Then, the $T_5$ is switched to be shut off and the $T_6$ is switched to be conducted at the time $t_2$; the $T_1$, the $T_2$, and the $T_4$ may be shut off; and the $T_3$ may be conducted. Referring to FIG. 9B, in this case, the second bus capacitor C2 charges the resonant circuit through a loop shown by a dashed line in the figure, and a sum of voltages borne by the $T_3$ and the $T_6$ is approximately an output voltage of the C2.

In some embodiments, the time $t_2$ is separated from the time $t_1$ by a first preset time, and duration of the first preset time is greater than or equal to a dead time of the $T_4$.

Figure 9C:
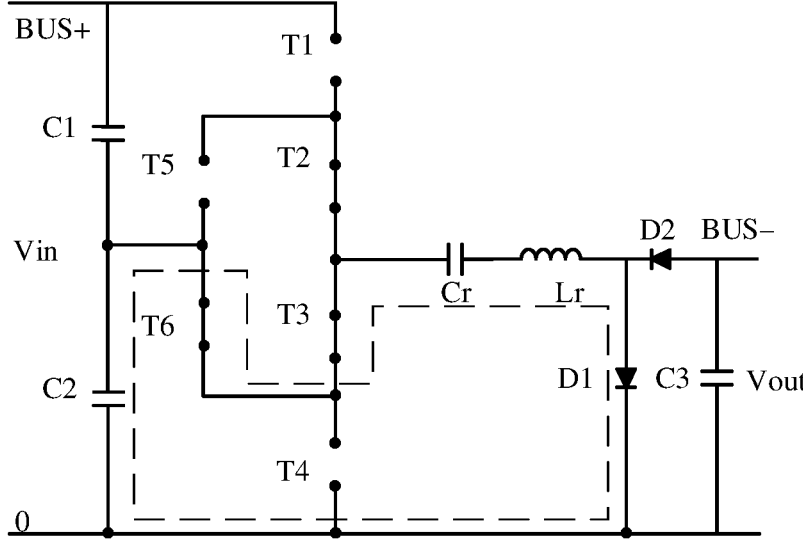
FIG. 9C is a state diagram 3 of an ANPC three-level resonant switched-capacitor converter according to an embodiment.

Then, the $T_2$ is switched to be conducted the $T_3$ is switched to be shut off at the time $t_3$; the $T_1$, the $T_4$, and the $T_5$ may be shut off; and the $T_6$ may be conducted. Referring to FIG. 9C, in this case, the second bus capacitor C2 charges the resonant circuit through a loop shown by a dashed line in the figure, and a sum of voltages borne by the $T_3$ and the $T_6$ is approximately the output voltage of the C2.

In some embodiments, the time $t_3$ is separated from the time $t_2$ by a second preset time, and duration of the second preset time is greater than or equal to a dead time of the $T_5$ and a dead time of the $T_6$.

Figure 9D:
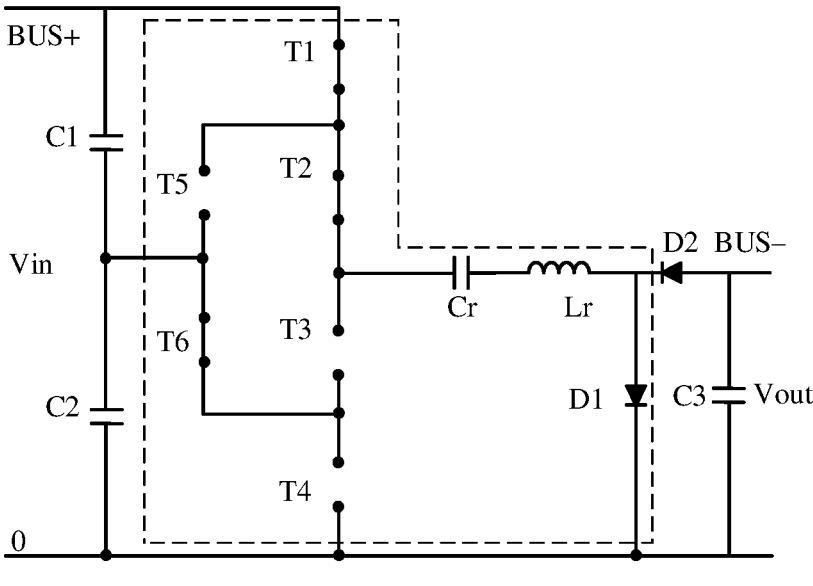
FIG. 9D is a state diagram 4 of an ANPC three-level resonant switched-capacitor converter according to an embodiment.

Then, the $T_1$ is switched to be conducted at the time $t_4$; the $T_3$, the $T_4$, and the $T_5$ may be shut off; and the $T_2$ and the $T_6$ may be conducted. Referring to FIG. 9D, in this case, the first bus capacitor C1 and the second bus capacitor C2 charge the resonant circuit through a loop shown by a dashed line in the figure. The $T_1$ and the $T_2$ are connected in series to the loop, and in this case, a voltage borne by each of the $T_1$ and the $T_2$ is approximately one half of the direct current voltage.

In some embodiments, the time $t_4$ is separated from the time $t_3$ by a third preset time, and duration of the third preset time is greater than or equal to a dead time of the $T_2$ and a dead time of the $T_3$.

Figure 9E:
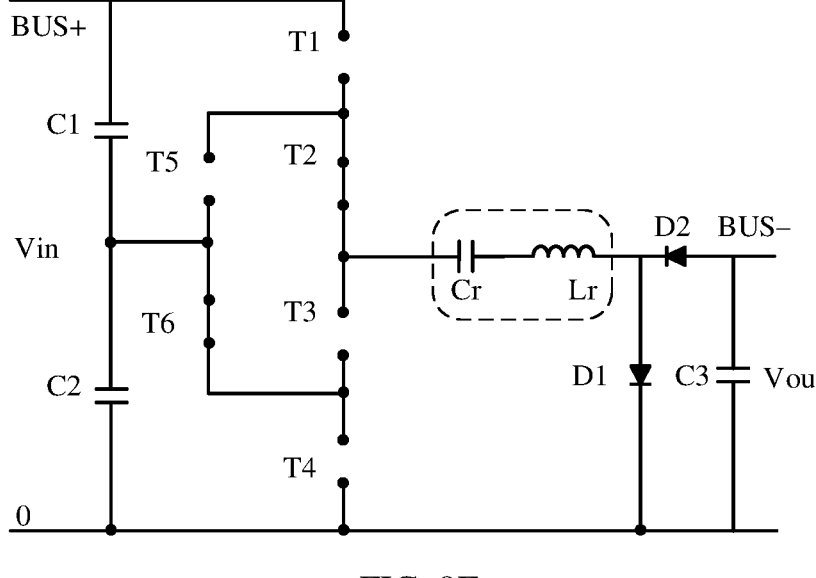
FIG. 9E is a state diagram 5 of an ANPC three-level resonant switched-capacitor converter according to an embodiment.

After charging of the resonant circuit is completed, the resonant circuit discharges a first capacitor C3. In this case, the $T_1$ is shut off first at the time $t_5$; the $T_3$, the $T_4$, and the $T_5$ may be shut off; and the $T_2$ and the $T_6$ may be conducted. Referring to FIG. 9E, in this case, the resonant circuit is configured to store energy.

Figure 9F:
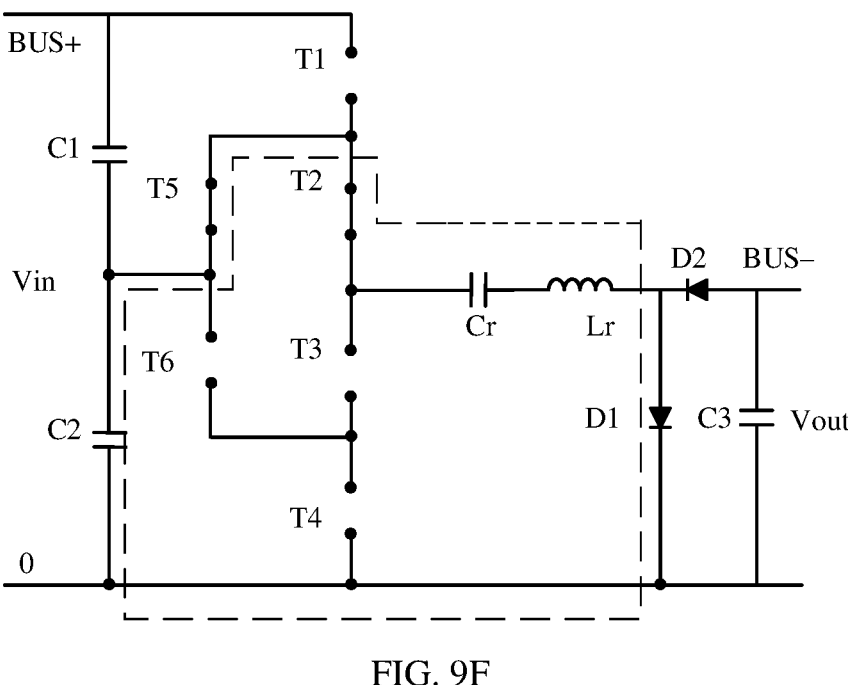
FIG. 9F is a state diagram 6 of an ANPC three-level resonant switched-capacitor converter according to an embodiment.

Then, the $T_5$ is switched to be conducted and the $T_6$ is switched to be shut off at the time $t_6$; the $T_1$, the $T_3$, and the $T_4$ may be shut off; and the $T_2$ may be conducted. Referring to FIG. 9F, in this case, when a discharging voltage of the resonant circuit is greater than voltages at both terminals of the second bus capacitor C2, discharging is performed through a loop shown by a dashed line in the figure. In this case, a maximum voltage borne by the $T_2$ and the $T_5$ is approximately one half of the direct current voltage.

In some embodiments, the time $t_6$ is separated from the time $t_5$ by a fourth preset time, and duration of the fourth preset time is greater than or equal to a dead time of the $T_1$.

Figure 9G:
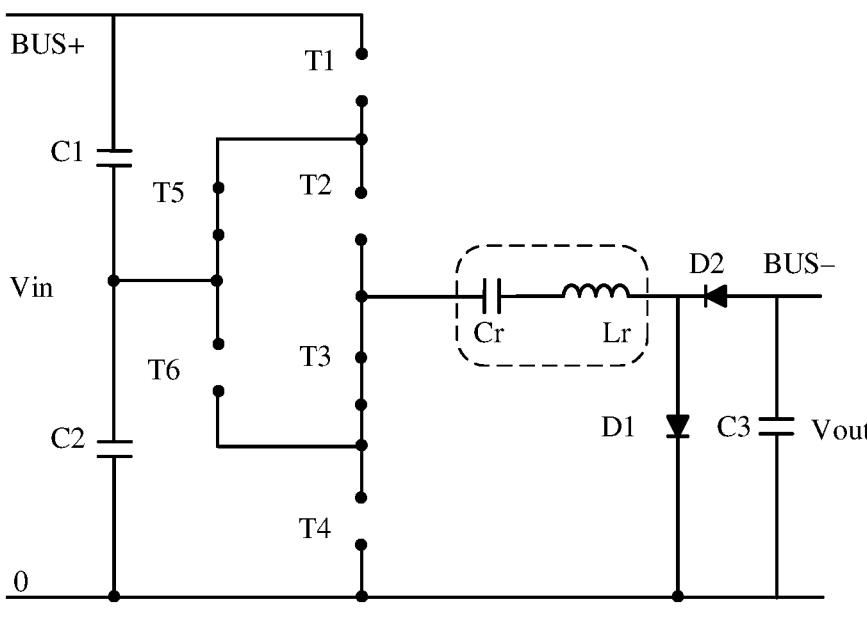
FIG. 9G is a state diagram 7 of an ANPC three-level resonant switched-capacitor converter according to an embodiment.

Then, the $T_2$ is switched to be in a shut-off state and the $T_3$ is switched to be in a conducting state at the time $t_7$; the $T_1$, the $T_4$, and the $T_6$ may be shut off; and the $T_5$ may be conducted. Referring to FIG. 9G, in this case, the resonant circuit is configured to store energy.

In some embodiments, the time $t_7$ is separated from the time $t_6$ by a fifth preset time, and duration of the fifth preset time is greater than or equal to a dead time of the $T_5$ and a dead time of the $T_6$.

Figure 9H:
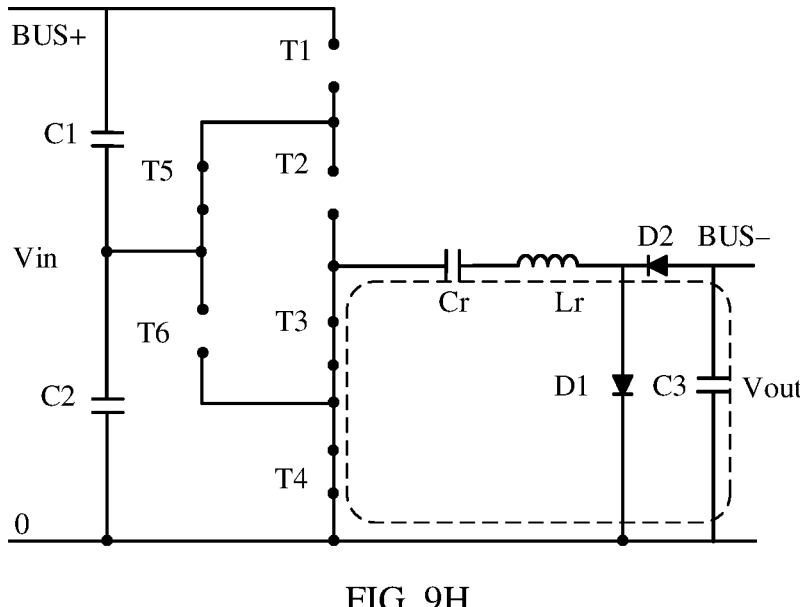
FIG. 9H is a state diagram 8 of an ANPC three-level resonant switched-capacitor converter according to an embodiment.

Then, the $T_4$ is switched to be in a conducting state at the time $t_8$; the $T_1$, the $T_2$, and the $T_6$ may be shut off; and the $T_3$ and the $T_5$ may be conducted. Referring to FIG. 9H, in this case, a current loop of the resonant circuit is shown by a dashed line in the figure, and voltages at both terminals of each of the $T_3$ and the $T_4$ do not exceed one half of the direct current voltage.

In some embodiments, the time $t_8$ is separated from the time $t_7$ by a sixth preset time, and duration of the sixth preset time is greater than or equal to a dead time of the $T_2$ and a dead time of the $T_3$.

In conclusion, by using the direct current converter provided in this embodiment, a voltage borne by power switching components in the direct current converter during current conversion can be reduced, thereby improving reliability of the direct current converter.

In some embodiments, the $T_1$ and the $T_4$ are power switching components of a same specification, the $T_2$ and the $T_3$ are power switching components of a same specification, and the $T_5$ and the $T_6$ are power switching components with a same specification. In this case, the first preset time is equal to the fourth preset time, the second preset time is equal to the fifth preset time, and the third preset time is equal to the sixth preset time.

In some other embodiments, specifications of the power switching components $T_1$ to $T_6$ are the same. In this case, the first preset time to the sixth preset time may be the same.

Based on the direct current converter provided in the foregoing embodiment, an embodiment further provides a direct current combiner box. Detailed description is provided below with reference to accompanying drawings.

Figure 10:
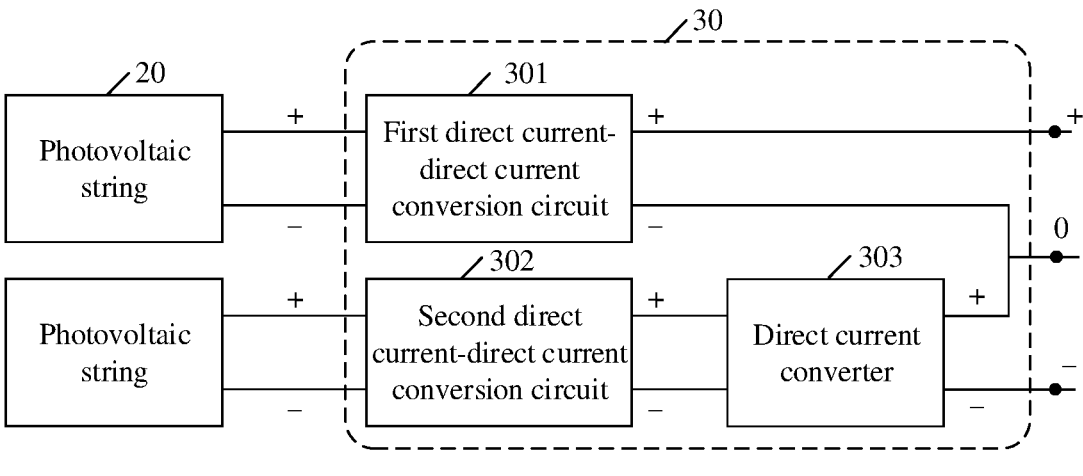
FIG. 10 is a schematic diagram of a direct current combiner box according to an embodiment.

FIG. 10 is a schematic diagram of a direct current combiner box according to an embodiment.

The direct current combiner box 30 corresponds to the MPPT boost combiner box 18 in FIG. 2 and includes a first direct current-direct current conversion circuit 301, a second direct current-direct current conversion circuit 302, and a direct current converter 303.

An input end of the first direct current-direct current conversion circuit 301 and an input end of the second direct current-direct current conversion circuit 302 are used to connect to different direct current power supplies, that is, used to connect to a photovoltaic string 20.

The input end of the first direct current-direct current conversion circuit 301 and the input end of the second direct current-direct current conversion circuit 302 may be connected to a plurality of photovoltaic strings 20. The first direct current-direct current conversion circuit 301 is used as an example. Positive electrode output of the plurality of photovoltaic strings is connected in parallel to a positive input end of the first direct current-direct current conversion circuit 301, and negative electrode output of the plurality of photovoltaic strings is connected in parallel to a negative input end of the first direct current-direct current conversion circuit 301.

A positive output end of the first direct current-direct current conversion circuit 301 is connected to a positive output end of the direct current combiner box 30, and a negative output end of the first direct current-direct current conversion circuit 301 is connected to an output port zero of the direct current combiner box.

A positive output end of the second direct current-direct current conversion circuit 302 is connected to a positive input end of the direct current converter 303, and a negative output end of the second direct current-direct current conversion circuit is connected to a negative input end of the direct current converter 303.

A positive output end of the direct current converter 303 is connected to the output port zero of the direct current combiner box 30, and a negative output end of the direct current converter 303 is connected to a negative output end of the direct current combiner box 30.

In this embodiment, a circuit topology of the first direct current-direct current conversion circuit 301 and a circuit topology of the second direct current-direct current conversion circuit 302 are not limited. For example, a boost circuit, a buck circuit, or a buck-boost circuit may be used.

For an implementation and a working principle of the direct current converter 303, refer to related descriptions in the foregoing embodiments. Details are not described herein again in this embodiment.

Figure 11:
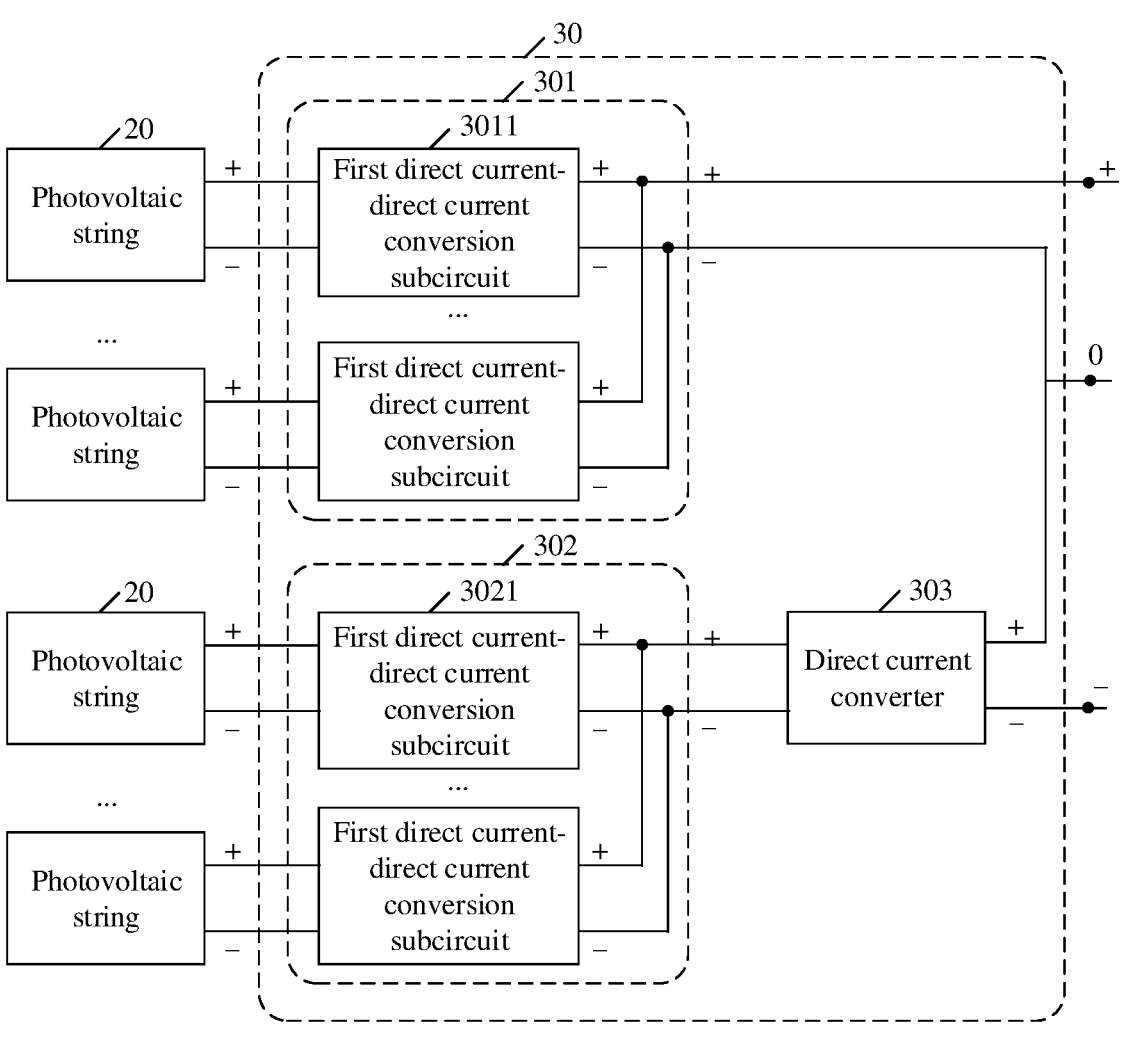
FIG. 11 is a schematic diagram of another direct current combiner box according to an embodiment.

FIG. 11 is a schematic diagram of another direct current combiner box according to an embodiment.

A first direct current-direct current conversion circuit 301 includes at least two first direct current-direct current conversion subcircuits 3011, and input ends of the at least two first direct current-direct current conversion subcircuits 3011 are used to connect to different direct current power supplies, that is, connect to different photovoltaic strings 20.

A positive output end of the first direct current-direct current conversion subcircuit 3011 is used to connect to a positive output end of the first direct current-direct current conversion circuit 301, and a negative output end of the first direct current-direct current conversion subcircuit 3011 is used to connect to a negative output end of the first direct current-direct current conversion circuit 301.

A second direct current-direct current conversion circuit 302 includes at least two second direct current-direct current conversion subcircuits 3021, and input ends of the at least two second direct current-direct current conversion subcircuits 3021 are used to connect to different direct current power supplies, that is, connect to different photovoltaic strings.

A positive output end of the second direct current-direct current conversion subcircuit 3021 is used to connect to a positive output end of the second direct current-direct current conversion circuit 302, and a negative output end of the second direct current-direct current conversion subcircuit 3021 is used to connect to a negative output end of the second direct current-direct current conversion circuit 302.

In some embodiments, an output voltage of the first direct current-direct current conversion circuit 301 is the same as an output voltage of the second direct current-direct current conversion circuit, and an output voltage of a direct current converter 303 and a direct current voltage at an input end have the same magnitude and are in opposite directions. In this case, a voltage at a positive output end of a direct current combiner box 30 and a voltage at a negative output end of the direct current combiner box 30 have the same magnitude and are in opposite directions.

In some other embodiments, a controller of the direct current converter 303 is further configured to control the first direct current-direct current conversion circuit 301 and the second direct current-direct current conversion circuit 302. In other words, the controller of the direct current converter 303 and a controller for the first direct current-direct current conversion circuit 301 and the second direct current-direct current conversion circuit 302 are integrated together.

In conclusion, the direct current converter included in the direct current combiner box provided in this embodiment uses a resonant circuit to transfer energy. This not only reduces a volume of the direct current converter, but also enables power switching components to work in a soft-switching state, thereby reducing a switching loss and improving efficiency. In addition, the controller of the direct current converter controls a three-level power switching circuit, so that when the resonant circuit switches from performing discharging to performing charging, and a charging voltage is equal to one half of the direct current voltage, one of the power switching components is connected to a current loop of the resonant circuit. In this case, a voltage borne by the power switching component is only one half of the direct current voltage. When the charging voltage is equal to the direct current voltage, the controller controls two of the power switching components to connect in series to the current loop of the resonant circuit, so that a voltage borne by each power switching component is also one half of the direct current voltage. When the resonant circuit switches from performing charging to performing discharging, and a discharging voltage is one half of the direct current voltage, one of the power switching components is first controlled to connect to the current loop of the resonant circuit, and in this case, a voltage borne by the power switching component is only one half of the direct current voltage. When the discharging voltage is equal to the direct current voltage, the controller controls two of the power switching components connected in series to connect to the current loop, and in this case, a voltage borne by each power switching component is also one half of the discharging voltage. Therefore, a voltage borne by power switching components in the direct current converter during current conversion is reduced, thereby improving reliability of the direct current converter.

An embodiment may further provide a control method for a direct current converter. The method is applied to the direct current converter provided in the foregoing embodiments, to improve reliability of the direct current converter. Details are described below.

FIG. 12 is a flowchart of a control method for a direct current converter according to an embodiment.

For an implementation of the direct current converter, refer to related descriptions in the foregoing embodiments. Details are not described herein again in this embodiment. The method includes the following steps.

S1201: Control power switching components in a three-level power switching circuit, so that when a resonant circuit performs charging or discharging at one half of a direct current voltage, one of the power switching components is connected to a current loop of the resonant circuit.

S1202: Control the power switching component in the three-level power switching circuit, so that when the resonant circuit performs charging or discharging at the direct current voltage, two of the power switching components are connected to the current loop of the resonant circuit.

For the three-level power switching circuit, the resonant circuit is used to transfer energy. A first terminal of a first bus capacitor is connected to a positive input end of the direct current converter, and a second terminal of the first bus capacitor is connected to a middle point of a bus capacitor. A first terminal of a second bus capacitor is connected to the middle point of the bus capacitor, and a second terminal of the second bus capacitor is connected to a negative input end of the direct current converter.

When the resonant circuit is charged, and a charging voltage is equal to one half of the direct current voltage, that is, when only one bus capacitor charges the resonant circuit, in this case, a controller controls one of the power switching components to connect to a charging loop of the resonant circuit, and a voltage borne by the power switching component is only one half of the direct current voltage. When the charging voltage of the resonant circuit is equal to the direct current voltage, the first bus capacitor and the second bus capacitor charge the resonant circuit, and the controller controls two of the power switching components to connect to the charging loop of the resonant circuit, so that a voltage borne by each power switching component is also one half of the direct current voltage.

When the resonant circuit is discharged, and a discharging voltage is equal to one half of the direct current voltage, the controller controls one of the power switching components to connect to a discharging loop of the resonant circuit. In this case, the resonant circuit and a bus capacitor are connected in series to the current loop. A voltage borne by the power switching component is equal to a voltage formed by discharging of the resonant circuit minus voltages at both terminals of the bus capacitor and is also one half of the direct current voltage. When the discharging voltage of the resonant circuit is equal to the direct current voltage, the controller controls two of the power switching components to connect to the discharging loop of the resonant circuit, so that a voltage borne by each power switching component is also one half of the discharging voltage.

A resonant frequency of the resonant circuit is greater than or equal to a switching frequency of the three-level power switching circuit.

The following separately describes implementations of the direct current converter.

In a possible implementation, the direct current converter is a neutral point clamped three-level resonant switched-capacitor converter. For a circuit implementation of the direct current converter, refer to FIG. 4.

In this case, when the resonant circuit switches from performing a discharging process to performing a charging process, first a T4 is controlled to be shut off, a T2 is controlled to be conducted after a first preset time, a T3 is controlled to be shut off after a second preset time, and a T1 is controlled to be conducted after a third preset time.

When the resonant circuit switches from performing the charging process to performing the discharging process, first the T1 is controlled to be shut off, the T3 is controlled to be conducted after a fourth preset time, the T2 is controlled to be shut off after a fifth preset time, and the T4 is controlled to be conducted after a sixth preset time.

In another possible implementation, the direct current converter is an active neutral point clamped three-level resonant switched-capacitor converter. For a circuit implementation of the direct current converter, refer to FIG. 7.

In this case, when the resonant circuit switches from performing a charging process to performing a discharging process, first a T4 is controlled to be shut off, a T5 is controlled to be shut off and a T6 is controlled to be conducted after a first preset time, a T3 is controlled to be shut off and a T2 is controlled to be conducted after a second preset time, and a T1 is controlled to be conducted after a third preset time.

When the resonant circuit switches from performing the discharging process to performing the charging process, first the T1 is controlled to be shut off, the T6 is controlled to be shut off and the T5 is controlled to be conducted after a fourth preset time, the T2 is controlled to be shut off and the T3 is controlled to be conducted after a fifth preset time, and the T4 is controlled to be conducted after a sixth preset time.

In some embodiments, the first preset time is equal to the fourth preset time, the second preset time is equal to the fifth preset time, and the third preset time is equal to the sixth preset time.

In conclusion, by using the control method provided in this embodiment, a voltage borne by power switching components is one half of a direct current voltage at an input end when the direct current converter performs current conversion. This reduces the voltage borne by the power switching component and improves reliability of the direct current converter.

Based on the direct current converter provided in the foregoing embodiment, an embodiment further provides a photovoltaic power generation system. Detailed description is provided below with reference to accompanying drawings.

Figure 13:
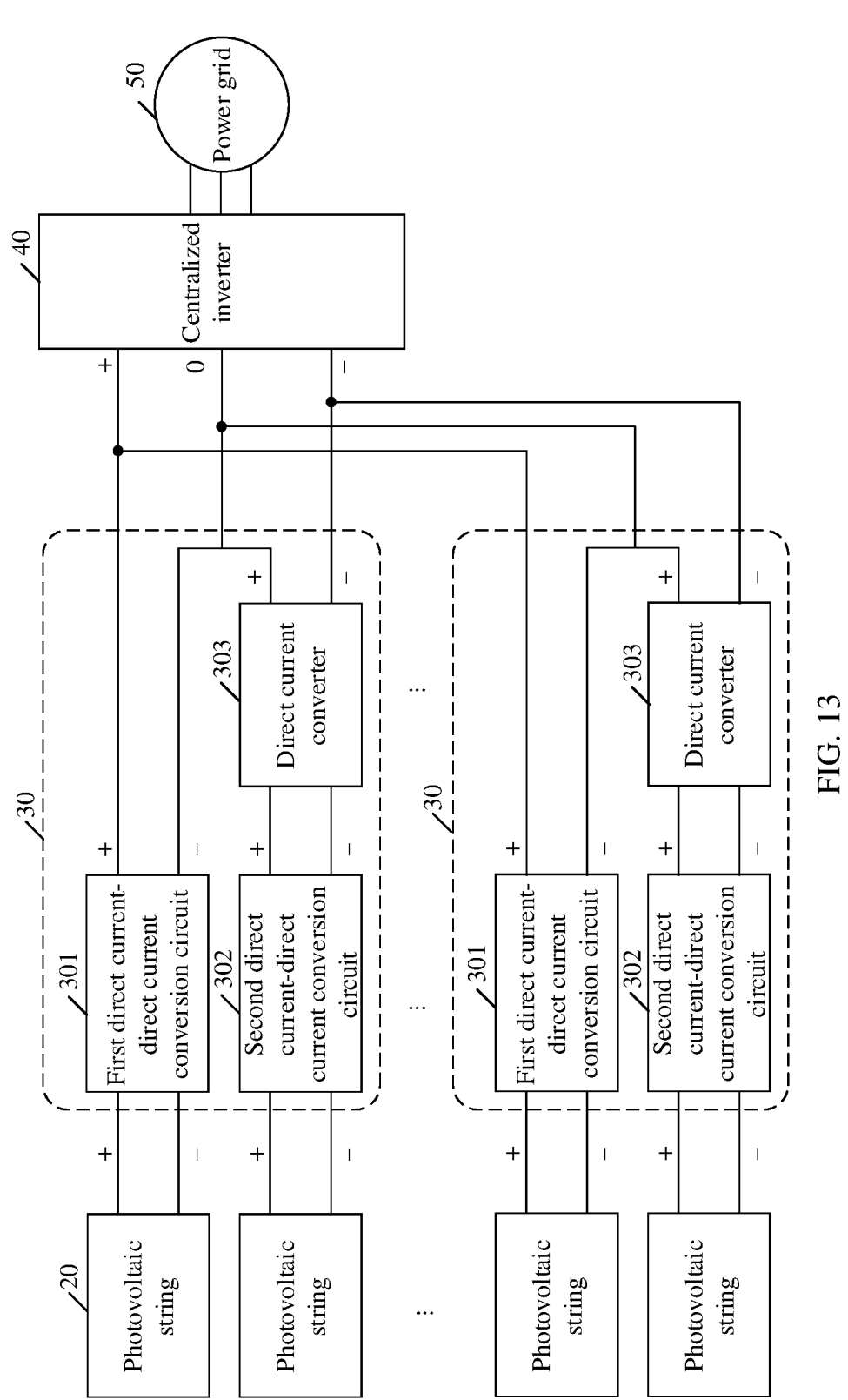
FIG. 13 is a schematic diagram of a photovoltaic power generation system according to an embodiment.

FIG. 13 is a schematic diagram of a photovoltaic power generation system according to an embodiment.

The photovoltaic power generation system in the figure includes a photovoltaic string 20, a photovoltaic inverter (shown as a centralized inverter 40 in the figure), and at least one direct current combiner box 30.

The photovoltaic string 20 includes at least one photovoltaic module. The photovoltaic string 20 is configured to convert light energy into a direct current.

An input end of a first direct current-direct current conversion circuit 301 and an input end of a second direct current-direct current conversion circuit 302 are separately connected to at least one photovoltaic string.

A positive output end of the direct current combiner box 30 is used to connect to a positive input end of the centralized inverter 40, a negative output end of the direct current combiner box 30 is used to connect to a negative input end of the centralized inverter 40, and an output port zero of the direct current combiner box 30 is used to connect to an input port zero of the centralized inverter 40.

When the photovoltaic power generation system includes a plurality of direct current combiner boxes 30, positive output ends of the direct current combiner boxes 30 are connected in parallel, negative output ends of the direct current combiner boxes 30 are connected in parallel, and output port zeros of the direct current combiner boxes 30 are connected in parallel.

The centralized inverter 40 is configured to convert a direct current input by the direct current combiner box into an alternating current.

A direct current converter of the photovoltaic power generation system provided in embodiments uses a resonant circuit to transfer energy. This not only reduces a volume of the direct current converter, but also enables power switching components to work in a soft-switching state, thereby reducing a switching loss and improving efficiency. In addition, a controller of the direct current converter controls a three-level power switching circuit, so that when the resonant circuit switches from performing discharging to performing charging, and a charging voltage is equal to one half of a direct current voltage, one of the power switching components is connected to a current loop of the resonant circuit. In this case, a voltage borne by the power switching component is only one half of the direct current voltage. When the charging voltage is equal to the direct current voltage, the controller controls two of the power switching components to connect in series to the current loop of the resonant circuit, so that a voltage borne by each power switching component is also one half of the direct current voltage. When the resonant circuit switches from performing charging to performing discharging, and a discharging voltage is one half of the direct current voltage, one of the power switching components is first controlled to connect to the current loop of the resonant circuit, and in this case, a voltage borne by the power switching component is only one half of the direct current voltage. When the discharging voltage is equal to the direct current voltage, the controller controls two of the power switching components connected in series to connect to the current loop, and in this case, a voltage borne by each power switching component is also one half of the discharging voltage. Therefore, a voltage borne by power switching components in the direct current converter during current conversion can be reduced, thereby improving reliability of the direct current converter, and further improving reliability of the photovoltaic power generation system.

It should be understood that, "at least one" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" may indicate an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended to describe the embodiments but not to limit them. Although described in detail with reference to the foregoing embodiments, persons of ordinary skill in the art should understand that they may still make modifications without departing from the spirit and scope of the solutions of the embodiments.

What is claimed is:

1. A direct current converter for connecting a direct current power supply, the direct current converter comprising:
   a three-level power switching circuit;
   a first diode;
   a second diode;
   a first capacitor, wherein
   a first output end of the three-level power switching circuit is connected to an anode of the first diode and a cathode of the second diode by using the resonant circuit, and a second output end of the power switching circuit is connected to a cathode of the first diode; and
   the cathode of the first diode is connected to a positive output end of the direct current converter, an anode of the second diode is connected to a negative output end of the direct current converter, and the first capacitor is connected in parallel between the positive output end and the negative output end;
   a resonant circuit; and
   a controller, wherein
   an input end of the three-level power switching circuit is connected to the direct current power supply, and an output voltage at an output end of the three-level power switching circuit is used to charge the resonant circuit; and
   the controller is configured to control power switching components in the three-level power switching circuit, so that when the resonant circuit performs charging or discharging at one half of a direct current voltage, one of the power switching components is connected to a loop in which the resonant circuit is located, and when the resonant circuit performs charging or discharging at the direct current voltage, two of the power switching components are connected to the loop in which the resonant circuit is located.

2. The direct current converter according to claim 1, wherein the three-level power switching circuit comprises:
   a first bus capacitor,
   a second bus capacitor,
   a third diode,
   a fourth diode, and
   power switching components T1, T2, T3, and T4, wherein
   a first terminal of the T1 is connected to a first terminal of the first bus capacitor and a first input end of the three-level power switching circuit, a second terminal of the T1 is connected to a first terminal of the T2 and a cathode of the third diode, a second terminal of the T2 is connected to a first terminal of the T3 and the first output end of the three-level power switching circuit, a second terminal of the T3 is connected to an anode of the fourth diode and a first terminal of the T4, and a second terminal of the T4 is connected to a second output end of the three-level power switching circuit, a second terminal of the second bus capacitor, and a second input end of the three-level power switching circuit; and
   a second terminal of the first bus capacitor is connected to an anode of the third diode, a cathode of the fourth diode, and a first terminal of the second bus capacitor.

3. The direct current converter according to claim 2, wherein the controller is configured to:
   first control the T4 to be shut off,
   control the T2 to be conducted after a first preset time measured from shutting off T4,
   control the T3 to be shut off after a second preset time measured from conducting the T2, and
   control the T1 to be conducted after a third preset time measured from shutting off the T3, so that the resonant circuit switches from performing discharging to performing charging; and
   first control the T1 to be shut off,
   control the T3 to be conducted after a fourth preset time measured from shutting off the T1,
   control the T2 to be shut off after a fifth preset time measured from conducting the T3, and
   control the T4 to be conducted after a sixth preset time measured from shutting off the T2, so that the resonant circuit switches from performing charging to performing discharging.

4. The direct current converter according to claim 3, wherein the first preset time is equal to the fourth preset time, the second preset time is equal to the fifth preset time, and the third preset time is equal to the sixth preset time.

5. The direct current converter according to claim 1, wherein the three-level power switching circuit comprises:
   a first bus capacitor,
   second bus capacitor, and
   power switching components T1, T2, T3, T4, T5 and T6, wherein
   a first terminal of the T1 is connected to a first terminal of the first bus capacitor and a first input end of the three-level power switching circuit, a second terminal of the T1 is connected to a first terminal of the T2 and a first terminal of the T5, a second terminal of the T2 is connected to a first terminal of the T3 and a first output end of the three-level power switching circuit, a second terminal of the T3 is connected to a second terminal of the T6 and a first terminal of the T4, and a second terminal of the T4 is connected to a second output end of the three-level power switching circuit, a second terminal of the second bus capacitor, and a second input end of the three-level power switching circuit; and a second terminal of the first bus capacitor is connected to a second terminal of the T5, a first terminal of the T6, and a first terminal of the second bus capacitor.

6. The direct current converter according to claim 5, wherein the controller is configured to:

first control the T4 to be shut off, control the T5 to be shut off and the T6 to be conducted after a first preset time measured from shutting off the T4, control the T3 to be shut off and the T2 to be conducted after a second preset time measured from shutting off the T5 and conducting the T6, and control the T1 to be conducted after a third preset time measured from shutting off the T3 and conducting the T2, so that the resonant circuit switches from performing discharging to performing charging; and first control the T1 to be shut off, control the T6 to be shut off and the T5 to be conducted after a fourth preset time measured from shutting off the T1, control the T2 to be shut off and the T3 to be conducted after a fifth preset time measured from shutting off the T6 and conducting the T5, and control the T4 to be conducted after a sixth preset time measured from shutting off the T2 and conducting the T3, so that the resonant circuit switches from performing charging to performing discharging.

7. The direct current converter according to claim 1, wherein the resonant circuit comprises a resonant capacitor and a resonant inductor, and a resonant frequency of the resonant circuit is greater than or equal to a switching frequency of the three-level power switching circuit.

8. The direct current converter according to claim 1, wherein the controller is further configured to control an output voltage of the direct current converter to be the same as the direct current voltage in magnitude and to be opposite in direction with the direct current voltage.

9. A direct current combiner box, wherein the direct current combiner box comprises the direct current converter according to claim 1, and further comprises:

a first direct current-direct current conversion circuit; and a second direct current-direct current conversion circuit, wherein an input end of the first direct current-direct current conversion circuit and an input end of the second direct current-direct current conversion circuit are used to connect to different direct current power supplies;

a positive output end of the first direct current-direct current conversion circuit is connected to a positive output end of the direct current combiner box, and a negative output end of the first direct current-direct current conversion circuit is connected to an output port zero of the direct current combiner box;

a positive output end of the second direct current-direct current conversion circuit is connected to a positive input end of the direct current converter, and a negative output end of the second direct current-direct current conversion circuit is connected to a negative input end of the direct current converter; and a positive output end of the direct current converter is connected to the output port zero of the direct current combiner box, and a negative output end of the direct current converter is connected to a negative output end of the direct current combiner box.

10. The direct current combiner box according to claim 9, wherein the first direct current-direct current conversion circuit comprises:

at least two first direct current-direct current conversion subcircuits, input ends of the at least two first direct current-direct current conversion subcircuits are used to connect to different direct current power supplies, positive output ends of the at least two first direct current-direct current conversion subcircuits are used to connect to the positive output end of the first direct current-direct current conversion circuit, and negative output ends of the at least two first direct current-direct current conversion subcircuits are used to connect to the negative output end of the first direct current-direct current conversion circuit.

11. The direct current combiner box according to claim 9, wherein the second direct current-direct current conversion circuit comprises:

at least two second direct current-direct current conversion subcircuits, input ends of the at least two second direct current-direct current conversion subcircuits are used to connect to different direct current power supplies, positive output ends of the at least two second direct current-direct current conversion subcircuits are used to connect to the positive output end of the second direct current-direct current conversion circuit, and negative output ends of the at least two second direct current-direct current conversion subcircuits are used to connect to the negative output end of the second direct current-direct current conversion circuit.

12. The direct current combiner box according to claim 9, wherein an output voltage of the first direct current-direct current conversion circuit is the same as an output voltage of the second direct current-direct current conversion circuit.

13. The direct current combiner box according to claim 9, wherein a controller is further configured to control the first direct current-direct current conversion circuit and the second direct current-direct current conversion circuit.

14. A control method for a direct current converter, wherein the direct current converter is configured to connect to a direct current power supply, the direct current converter comprises a three-level power switching circuit, a resonant circuit, a first diode, a second diode, and a first capacitor, wherein a first output end of the three-level power switching circuit is connected to an anode of the first diode and a cathode of the second diode by using the resonant circuit, and a second output end of the power switching circuit is connected to a cathode of the first diode, the cathode of the first diode is connected to a positive output end of the direct current converter, an anode of the second diode is connected to a negative output end of the direct current converter, and the first capacitor is connected in parallel between the positive output end and the negative output end, an input end of the three-level power switching circuit is connected to the direct current power supply, an output voltage at an output end of the three-level power switching circuit is used to charge the resonant circuit, and the method comprises:

controlling power switching components in the three-level power switching circuit, so that when the resonant circuit performs charging or discharging at one half of a direct current voltage, one of the power switching components is connected to a current loop of the resonant circuit, and when the resonant circuit performs charging or discharging at the direct current voltage, two of the power switching components are connected to the current loop of the resonant circuit.

15. The control method according to claim 14, wherein the three-level power switching circuit comprises:

a first bus capacitor, a second bus capacitor, a third diode, a fourth diode, and power switching components T1, T2, T3, and T4, wherein a first terminal of the T1 is connected to a first terminal of the first bus capacitor and a first input end of the three-level power switching circuit, a second terminal of the T1 is connected to a first terminal of the T2 and a cathode of the third diode, a second terminal of the T2 is connected to a first terminal of the T3 and a first output end of the three-level power switching circuit, a second terminal of the T3 is connected to an anode of the fourth diode and a first terminal of the T4, and a second terminal of the T4 is connected to a second output end of the three-level power switching circuit, a second terminal of the second bus capacitor, and a second input end of the three-level power switching circuit; a second terminal of the first bus capacitor is connected to an anode of the third diode, a cathode of the fourth diode, and a first terminal of the second bus capacitor; and the controlling power switching components in the three-level power switching circuit comprises:

first controlling the T4 to be shut off, controlling the T2 to be conducted after a first preset time measured from shutting off the T4, controlling the T3 to be shut off after a second preset time measured from conducting the T2, and controlling the T1 to be conducted after a third preset time measured from shutting off the T3, so that the resonant circuit switches from performing discharging to performing charging; and first controlling the T1 to be shut off, controlling the T3 to be conducted after a fourth preset time measured from shutting off the T1, controlling the T2 to be shut off after a fifth preset time measured from conducting the T3, and controlling the T4 to be conducted after a sixth preset time measured from shutting off the T2, so that the resonant circuit switches from performing charging to performing discharging.

16. The control method according to claim 15, wherein the first preset time is equal to the fourth preset time, the second preset time is equal to the fifth preset time, and the third preset time is equal to the sixth preset time.

17. The control method according to claim 14, wherein the three-level power switching circuit comprises:

a first bus capacitor, a second bus capacitor, and power switching components T1, T2, T3, T4, T5, and T6, wherein a first terminal of the T1 is connected to a first terminal of the first bus capacitor and a first input end of the three-level power switching circuit, a second terminal of the T1 is connected to a first terminal of the T2 and a first terminal of the T5, a second terminal of the T2 is connected to a first terminal of the T3 and a first output end of the three-level power switching circuit, a second terminal of the T3 is connected to a second terminal of the T6 and a first terminal of the T4, and a second terminal of the T4 is connected to a second output end of the three-level power switching circuit, a second terminal of the second bus capacitor, and a second input end of the three-level power switching circuit; a second terminal of the first bus capacitor is connected to a second terminal of the T5, a first terminal of the T6, and a first terminal of the second bus capacitor; and the controlling power switching components in the three-level power switching circuit comprises:

first controlling the T4 to be shut off, controlling the T5 to be shut off and the T6 to be conducted after a first preset time measured from shutting off the T4, controlling the T3 to be shut off and the T2 to be conducted after a second preset time measured from shutting off the T5 and conducting the T6, and controlling the T1 to be conducted after a third preset time measured from shutting off the T3 and conducting the T2, so that the resonant circuit switches from performing discharging to performing charging; and first controlling the T1 to be shut off, controlling the T6 to be shut off and the T5 to be conducted after a fourth preset time measured from shutting off the T1, controlling the T2 to be shut off and the T3 to be conducted after a fifth preset time measured from shutting off the T6 and conducting the T5, and controlling the T4 to be conducted after a sixth preset time measured from shutting off the T2 and conducting the T3, so that the resonant circuit switches from performing charging to performing discharging.

18. The control method according to claim 14, wherein a resonant frequency of the resonant circuit is greater than or equal to a switching frequency of the three-level power switching circuit.

* * * * *